(12) United States Patent
Shin et al.

(10) Patent No.: US 9,213,212 B2
(45) Date of Patent: Dec. 15, 2015

(54) LENS PANEL, METHOD FOR MANUFACTURING THE LENS PANEL, DISPLAY APPARATUS HAVING THE LENS PANEL, DISPLAY PANEL, A METHOD FOR MANUFACTURING THE DISPLAY PANEL AND A DISPLAY APPARATUS HAVING THE DISPLAY PANEL

(75) Inventors: Yong-Hwan Shin, Yongin-si (KR); Bong-Sung Seo, Yongin-si (KR); Min-Sik Jung, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 154 days.

(21) Appl. No.: 13/358,379

(22) Filed: Jan. 25, 2012

(65) Prior Publication Data
US 2012/0300141 A1    Nov. 29, 2012

(30) Foreign Application Priority Data

May 27, 2011    (KR) .................. 10-2011-0050749
Jun. 9, 2011    (KR) .................. 10-2011-0055732

(51) Int. Cl.
  *G02F 1/29* (2006.01)
  *G02F 1/33* (2006.01)
  *G02F 1/1337* (2006.01)
  *G02B 3/14* (2006.01)
  *G02B 27/22* (2006.01)
  *G02F 1/1335* (2006.01)

(52) U.S. Cl.
  CPC .............. *G02F 1/29* (2013.01); *G02B 27/2214* (2013.01); *G02F 1/133753* (2013.01); *G02B 3/14* (2013.01); *G02F 2001/133538* (2013.01); *G02F 2001/133757* (2013.01)

(58) Field of Classification Search
  CPC .................................. G02F 1/133753
  USPC ............................................. 349/15
  See application file for complete search history.

(56) References Cited

U.S. PATENT DOCUMENTS

| 7,375,784 | B2 * | 5/2008 | Smith et al. .................. 349/129 |
| 7,452,074 | B2 * | 11/2008 | Kumar et al. ............. 351/159.01 |
| 2003/0058264 | A1 * | 3/2003 | Takako et al. ................. 345/698 |
| 2007/0195410 | A1 * | 8/2007 | Yun et al. ....................... 359/464 |
| 2009/0015739 | A1 * | 1/2009 | Shin et al. ........................ 349/15 |
| 2009/0190048 | A1 * | 7/2009 | Hong et al. ...................... 349/15 |

(Continued)

FOREIGN PATENT DOCUMENTS

| JP | 2005-148654 | 6/2005 |
| JP | 2006-313248 | 11/2006 |
| KR | 10-2009-0040587 | 4/2009 |

*Primary Examiner* — Edward Glick
*Assistant Examiner* — Alexander Gross
(74) *Attorney, Agent, or Firm* — H.C. Park & Associates, PLC

(57) ABSTRACT

A lens panel includes a first substrate, a second substrate and a liquid crystal layer. The first substrate includes a first base substrate, a first electrode formed on the first base substrate, and a first alignment layer formed on the first electrode. The first alignment layer includes a plurality of unit alignment areas forming a lens unit and is aligned to have a first azimuth angle and a plurality of first polarized angles. The first polarized angles vary in the unit alignment area. The second substrate includes a second base substrate, a second electrode formed on the second base substrate, and a second alignment layer aligned to have a second azimuth angle and a second polarized angle. The liquid crystal layer is disposed between the first substrate and the second substrate.

9 Claims, 16 Drawing Sheets

(56) References Cited

U.S. PATENT DOCUMENTS

| | | | |
|---|---|---|---|
| 2010/0149444 A1* | 6/2010 | Hikmet et al. | 349/15 |
| 2011/0096252 A1* | 4/2011 | Im | 349/15 |
| 2011/0199548 A1* | 8/2011 | Takama | 349/15 |

* cited by examiner

< 2D MODE >

< 3D MODE >

LENS PANEL, METHOD FOR MANUFACTURING THE LENS PANEL, DISPLAY APPARATUS HAVING THE LENS PANEL, DISPLAY PANEL, A METHOD FOR MANUFACTURING THE DISPLAY PANEL AND A DISPLAY APPARATUS HAVING THE DISPLAY PANEL

CROSS-REFERENCE TO RELATED APPLICATIONS

This application claims priority from and the benefit of Korean Patent Application No. 2011-0050749, filed on May 27, 2011, and Korean Patent Application No. 2011-0055732, filed on Jun. 9, 2011, which are hereby incorporated by reference of all purposes as if fully set forth herein.

BACKGROUND OF THE INVENTION

1. Field of the Invention

Exemplary embodiments of the present invention relate to a lens panel, a method for manufacturing the lens panel, a display apparatus having the lens panel, a display panel, a method for manufacturing the display panel, and a display apparatus having the display panel. Specifically, exemplary embodiments of the present invention relate to a lens panel and a display panel displaying a 2-dimensional (2D) image and a 3-dimensional (3D) stereoscopic image, a method for manufacturing the lens panel, a display apparatus having the lens panel, a method for manufacturing the display panel, and a display apparatus having the display panel.

2. Discussion of the Background

As the demand for 3D stereoscopic imaging increases in industrial fields, such as films, games, and the like, a stereoscopic image display apparatus displaying the 3D stereoscopic image has been developed. The stereoscopic image display apparatus displays the 3D stereoscopic image by respectively providing 2D images that differ for the left and right eyes of an observer. Thus, the observer recognizes a pair of two different 2D images, so that the observer may perceive a 3D stereoscopic image.

The stereoscopic image display apparatus may be either a stereoscopic type or an auto-stereoscopic type according to whether the observer uses special glasses. The auto-stereoscopic type may be implemented with various types, such as a barrier type, a lenticular type, and the like, to produce a flat display.

In the barrier type, a left-eye image pixel and a right-eye image pixel are alternately arranged, and a barrier is arranged in front of the viewer. If the viewer sees an image at a certain view point, the viewer separately recognizes a left-eye image and a right-eye image, so that the observer may perceive the 3D stereoscopic image.

In the lenticular type, the light passing through the left and right pixels is refracted using a lens, so that the 3D stereoscopic image may be displayed. The brightness in the lenticular type may be larger than that in the barrier type because most of the light passes through the lens.

The lens used in conjunction with the lenticular type may be a convex lens or a Fresnel lens. The Fresnel lens may be thinner than the convex lens. The Fresnel lens includes a plurality of circular arcs on a surface and a plurality of discontinuous lines formed at boundaries between the circular arcs. The Fresnel lens refracts light at the circular arcs and concentrates the light at one point.

Additionally, a grin lens may be used to display the stereoscopic image.

The above information disclosed in this Background section is only for enhancement of understanding of the background of the invention and therefore it may contain information that does not form any part of the prior art.

SUMMARY OF THE INVENTION

Exemplary embodiments of the present invention provide a lens panel capable of enhancing the response speed and reliability, thereby providing an enhanced 2D and 3D image from a display or device.

Additional features of the invention will be set forth in the description which follows, and in part will be apparent from the description, or may be learned by practice of the invention.

An exemplary embodiment of the present invention discloses a lens panel including: a first substrate that includes a first base substrate, a first electrode disposed on the first base substrate, and a first alignment layer disposed on the first electrode, the first alignment layer comprising a plurality of unit alignment areas that form a lens unit, and each of the plurality of unit alignment areas comprise a first azimuth angle and a plurality of first polar angles; a second substrate that includes a second base substrate, a second electrode formed on the second base substrate, and a second alignment layer that includes a second azimuth angle and a second polar angle; and a liquid crystal layer disposed between the first substrate and the second substrate.

An exemplary embodiment of the present invention discloses a method of manufacturing a lens panel, the method including: forming a first photoreactive polymer layer on a first base substrate on which a first electrode is formed; irradiating a light onto the first photoreactive polymer layer to form a first alignment layer, the first alignment layer comprising a plurality of unit alignment areas that form a lens unit, and each of the plurality of unit alignment areas comprising a first azimuth angle and a plurality of first polar angles; forming a second photoreactive polymer layer on a second base substrate on which a second electrode is formed; irradiating a light onto the second photoreactive polymer layer to form a second alignment layer comprising a second azimuth angle and a second polar angle; and injecting a liquid crystal material between the first base substrate and the second base substrate and sealing the first base substrate and the second base substrate.

An exemplary embodiment of the present invention discloses a display apparatus including: a panel module to display a 2-dimensional (2D) image or a 3-dimensional (3D) stereoscopic image; a lens panel that includes a first substrate, a second substrate, and a liquid crystal layer disposed between the first substrate and the second substrate, the first substrate including: a first alignment layer and a first electrode, the first alignment layer comprising a plurality of unit alignment areas, each of the plurality of unit alignment areas comprising a first azimuth angle and a plurality of first polar angles, the plurality of unit alignment areas forming a lens unit, the second substrate that includes a second alignment layer, and a second electrode, wherein the second alignment layer comprising a second azimuth angle and a second polar angle; and a light source module disposed along with the panel module to supply light to the panel module.

An exemplary embodiment of the present invention discloses a display panel including: a first substrate that includes a plurality of pixels, and a first alignment layer that includes a first azimuth angle and a plurality of first polar angles for each of the plurality of pixels; a second substrate that includes a second alignment layer comprising a second azimuth angle and a second polar angle; and a liquid crystal layer disposed between the first substrate and the second substrate.

An exemplary embodiment of the present invention discloses a method of manufacturing a display panel, the method including: forming a plurality of pixels on a first base substrate; forming a first photoreactive polymer layer on the first base substrate; irradiating a light onto the first photoreactive polymer layer to form a first alignment layer comprising a first azimuth angle and a plurality of first polar angles; forming a second photoreactive polymer layer on a second base substrate; irradiating a light onto the second photoreactive polymer layer to form a second alignment layer that includes a second azimuth angle and a second polar angle; and injecting a liquid crystal material between the first base substrate and the second base substrate and sealing the first base substrate and the second base substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
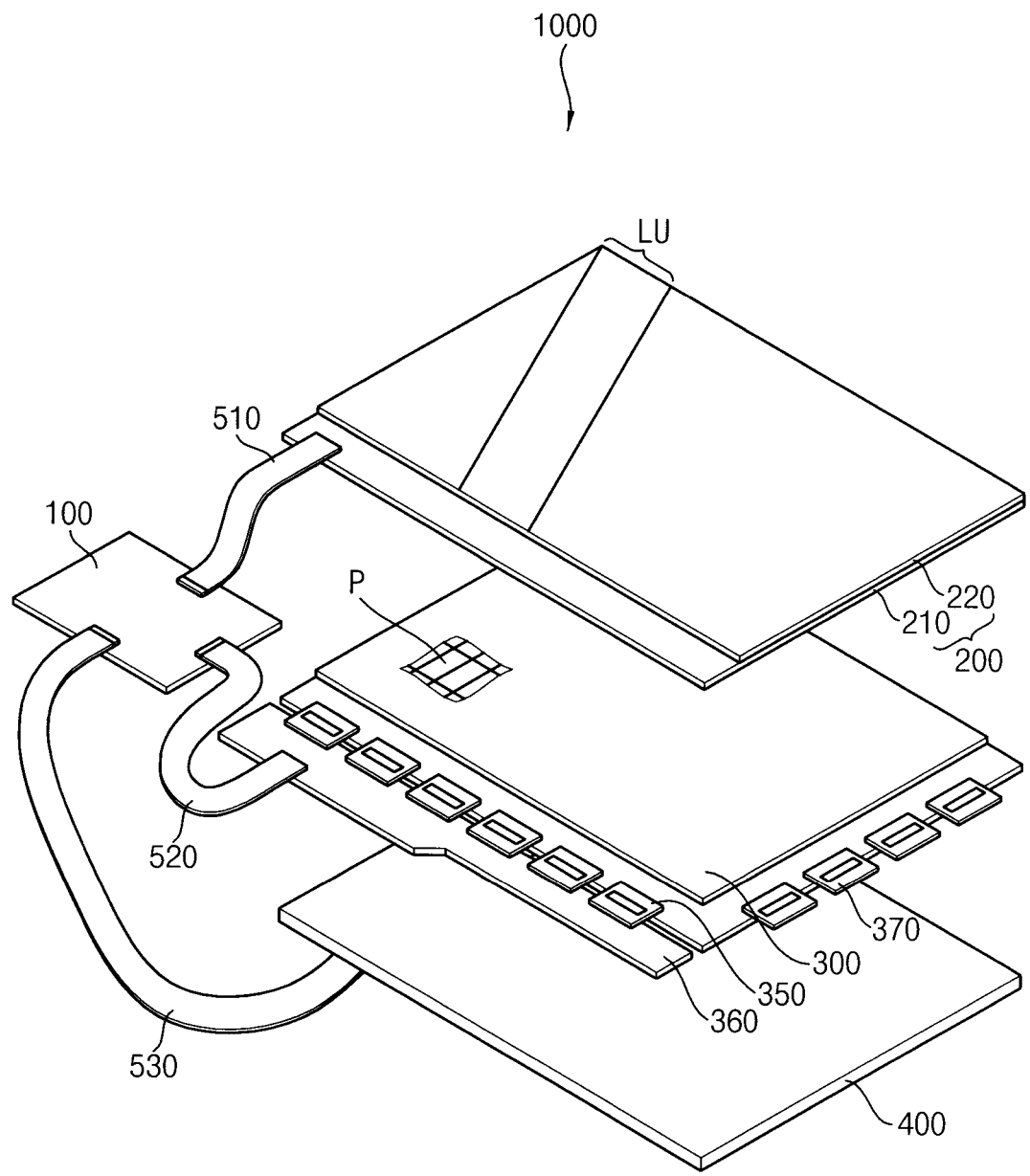
FIG. 1 is a perspective view illustrating a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present.

Referring to FIG. 1, a display apparatus 1000 includes a controller 100, a lens panel 200, a panel module and a light source module 400.

The controller 100 receives a 2-dimensional (2D) image or a 3-dimensional (3D) stereoscopic image from an image providing source, and controls the display apparatus 1000 to display the 2D image or the 3D stereoscopic image. The controller 100 may determine whether the lens panel 200 is driven as a Fresnel lens, and whether the panel module displays the 3D stereoscopic image. In addition, the controller 100 controls a brightness of the light source module 400 based on an image displayed by the display apparatus 1000. For example, if the display apparatus 1000 displays the 2D image, the controller 100 controls the light source module 400 to provide the light with a first brightness. If the display apparatus 1000 displays the 3D stereoscopic image, the controller 100 controls the light source module 400 to provide the light with a second brightness larger than the first brightness.

The lens panel 200 includes a first substrate 210, a second substrate 220 and a liquid crystal layer disposed between the first substrate 210 and the second substrate 220. Although not shown in FIG. 1, the first substrate 210 and the second substrate 220 include a first alignment layer and a second alignment layer, respectively. The first alignment layer and the second alignment layer may initially align liquid crystal molecules in the liquid crystal layer. If the lens panel 200 receives a voltage, the lens panel 200 forms a plurality of first lens units LU1.

The lens panel 200 may be driven in 2D image mode or 3D stereoscopic image mode. Thus, if the display apparatus 1000 displays the 3D stereoscopic image, voltages are applied to the first substrate 210 and the second substrate 220, respectively, and an arrangement of the liquid crystal molecules of the liquid crystal layer is changed by an electric field formed between the first substrate 210 and the second substrate 220. Since the liquid crystal molecules in the liquid crystal layer are initially aligned by the first alignment layer and the second alignment layer, the liquid crystal molecules have azimuth angles and phase shifts different form each other. Thus, the lens panel 200 forms the first lens unit LU1 driven as the Fresnel lens, which refracts light from a panel module, thereby allowing an observer to perceive the 3D stereoscopic image.

The panel module includes the display panel 300, a data circuit part 350, a source printed circuit board 360 and a gate circuit part 370. The data circuit part 350 applies a data voltage to a pixel P, and is electrically connected to the source printed circuit board 360. The gate circuit part 370 outputs a gate signal to the pixel P. The gate signal controls a charging time of the data voltage. The gate circuit part 370 may be mounted on the display panel 300 as a chip type, or alternatively, integrated on the display panel 300 with a thin film transistor of the display panel.

The light source module 400 emits light to the panel module. The light source module 400 includes a light source (not shown) that emits the light. The light source may include a fluorescent lamp and/or a light emitting diode (LED). The light source module 400 may be classified as a direct-illumination type or an edge-illumination type according to a position of the light source. For the edge-illumination type, the light source 400 may further include a light guide plate (not shown). In addition, the light source module 400 is controlled to be synchronized with the panel module and the lens panel 200.

The display apparatus 1000 may include a first connector 510 which electrically connects the controller 100 with the lens panel 200, a second connector 520 which electrically connects the controller 100 with the panel model, and a third connector 530 which electrically connects the controller 100 with the light source module 400. Each of the first connector 510, the second connector 520 and the third connector 530 may be a flexible printed circuit board (FPCB).

The first connector 510 may be connected to the lens panel 200 to apply a voltage to the first substrate 210 and the second substrate 220.

Figure 2:
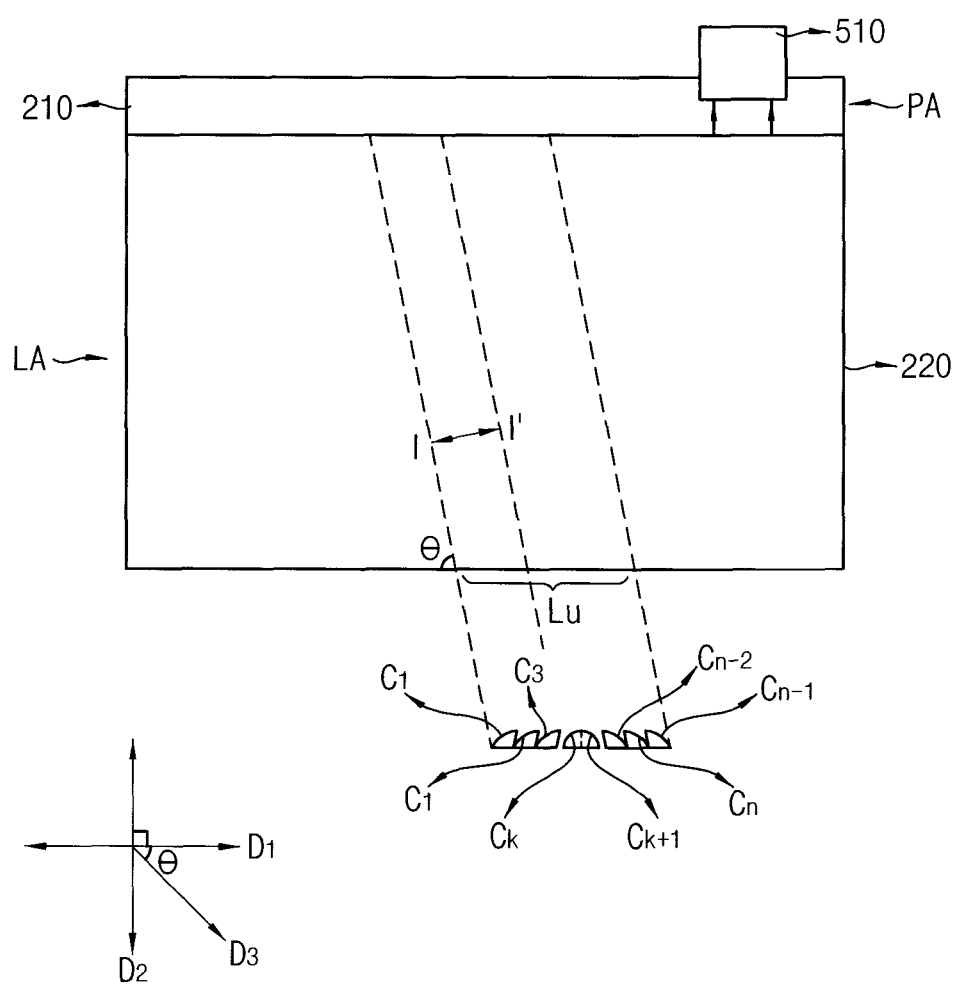
FIG. 2 is a plan view illustrating a lens panel according to an exemplary embodiment of the present invention.
Figure 3:
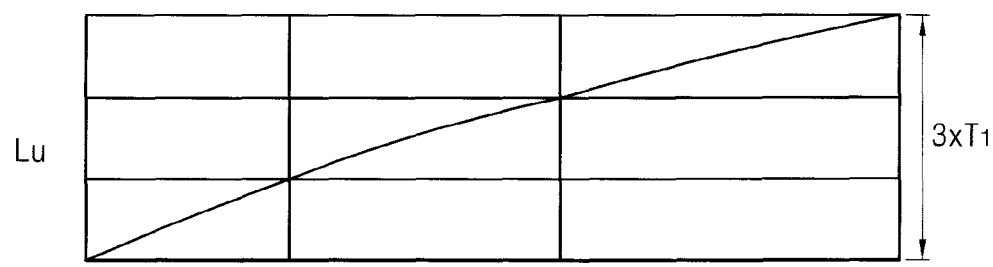
FIG. 3 is a cross-sectional view taken along a line I-I' of FIG. 2 and a graph illustrating a phase shift distribution according to an exemplary embodiment of the present invention.
Figure 3:
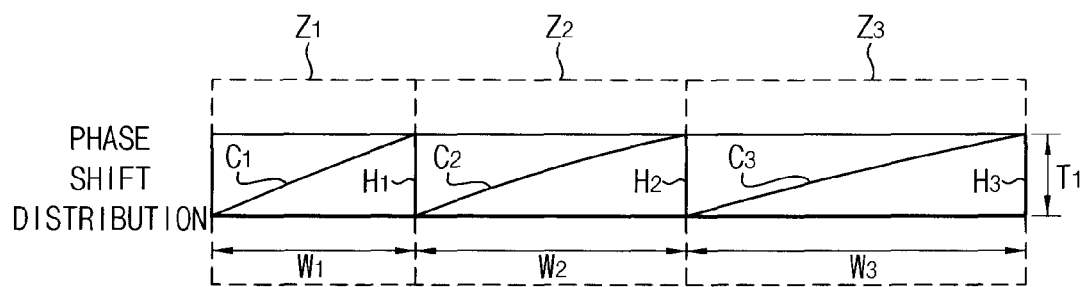
Figure 3:
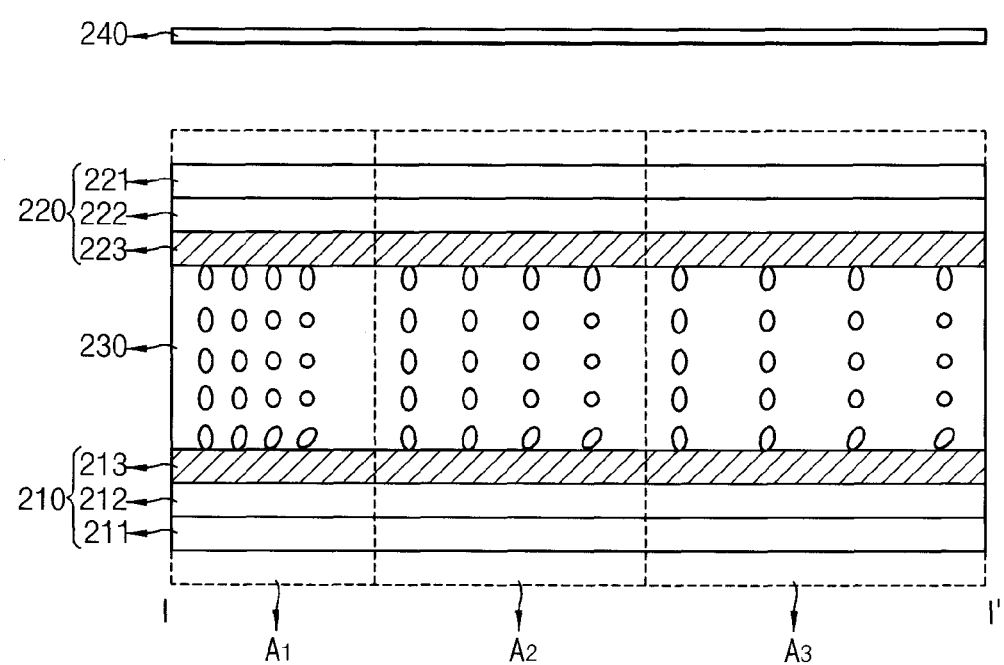

FIG. 2 is a plan view illustrating a lens panel in FIG. 1. FIG. 3 is a cross-sectional view taken along a line I-I' of FIG. 2 and a graph illustrating a phase shift distribution.

Referring to FIGS. 1 and 2, the lens panel 200 includes the first substrate 210, the second substrate 220 facing the first substrate 210, and the liquid crystal layer 230 disposed between the first substrate 210 and the second substrate 220. A liquid crystal material having negative permittivity and aligned vertically when an electric field is not applied, may be used. However, other liquid crystal materials with other properties may be used.

The lens panel 200 includes a lens area LA in which the first lens units LU1 are disposed and a peripheral area PA formed adjacent to the lens area LA.

The peripheral area PA is connected to the first connector 510 to transmit a voltage applied to the lens area LA. The first connector 510 may be a FPCB.

If the voltage is applied to the lens panel 200, the lens area LA may form a plurality of first lens units LU1. Each of the first lens units LU1 has a lens axis Lx. The lens axis Lx is inclined with respect to the second direction D2 by an inclined angle θ (0°<A<90°). The lens axis Lx of the first lens unit LU1 is substantially parallel with the third direction D3. Thus, the first lens units LU1 of the lens panel 200 are disposed on the display panel 300 of the panel module and are substantially parallel with each other along the lens axis Lx. The lens axis Lx may be inclined with respect to the second direction D2 by an inclined angle θ, but not limited thereto and the lens axis Lx may be changed according to a desired preference. For example, the lens axis Lx may be substantially parallel with the second direction D2.

If the voltage is applied to the lens panel 200, the lens panel 200 forms the plurality of first lens units LU1. The plurality of first lens units LU1 have a phase shift distribution substantially the same as the Fresnel lens which has a plurality of refractive areas Z1, Z2, Z3 . . . Zn−2, Zn−1 and Zn arranged along the first direction D1.

In the Fresnel lens, the convex lens is divided into areas having a certain thickness and adopting circular arcs of the areas. Each of the refractive areas Z1, Z2, Z3 . . . Zn−2, Zn−1 and Zn includes each of circular arcs C1, C2, C3 . . . Cn−2, Cn−1 and Cn and each of discontinuity lines H1, H2, H3 . . . Hn−2, Hn−1 and Hn. Each of the discontinuity lines H1, H2, H3 . . . Hn−2, Hn−1 and Hn is formed at an end of each of the circular arcs C1, C2, C3 . . . Cn−2, Cn−1 and Cn. The Fresnel lens is symmetric with respect to a center of the Fresnel lens. Thus, each of discontinuous lines H1, H2, H3 . . . Hn−2 and Hn−1, Hn has substantially the same length. However, each of widths W1, W2, W3 . . . Wn−2, Wn−1 and Wn along the first direction D1 of the refractive areas Z1, Z2, Z3 . . . Zn−2, Zn−1 and Zn increase as the refractive areas Z1, Z2, Z3 . . . Zn−2, Zn−1 and Zn are closer to the center of the Fresnel lens. In addition, in the Fresnel lens, the convex lens is divided into areas having a certain thickness and adopting circular arcs of the areas. Thus, a cell gap of the liquid crystal layer of the lens panel 200 which is driven as the Fresnel lens is decreased to be 1/K of a thickness of the convex lens. Here, K is equal to n/2, and n is the number of the circular arcs included in the Fresnel lens.

Thus, the lens panel 200 is divided into a plurality of alignment areas A1, A2, A3, An, which form the first lens units LU1 according to the refractive areas Z1, Z2, Z3 . . . Zn−2, Zn−1 and Zn of the Fresnel lens. The liquid crystal molecules in the liquid crystal are initially aligned to have pre-tilt angles different from each other in each of the alignment areas A1, A2, A3, An. The pre-tilt angles of the liquid crystal molecules disposed in the discontinuous lines H1, H2, H3 . . . Hn−2 and Hn−1, Hn may be largest in each of the alignment areas A1, A2, A3, An, and the pre-tilt angles of the liquid crystal molecules may decrease accordingly as the liquid crystal molecules are further away from the center of the first lens units LU1 in each of the alignment areas A1, A2, A3, An.

If voltage is applied to the lens panel 200, an arrangement of the liquid crystal molecules of the liquid crystal layer 230 between the first substrate 210 and the second substrate 220 is changed. The liquid crystal molecules in the liquid crystal layer 230 are aligned to have azimuth angles and phase shifts different form each other to form the first lens unit LU1. Thus, the lens panel 200 forms the first lens unit LU1, which is driven as a Fresnel lens.

The first substrate 210 includes a first base substrate 211. A first electrode 212 is formed on the first base substrate 211. The first electrode 212 is uniformly formed on an entire lens area LA of the first base substrate 211 without using an additional patterning process. The first electrode 212 may include a transparent conductive oxide material, such as, indium tin oxide (ITO), indium zinc oxide (IZO) and the like. The first electrode 212 receives substantially the same voltage from the entire the lens panel 200 because the first electrode 212 is formed without using an additional patterning process.

A first alignment layer 213 is formed on the first base substrate 211 on which the first electrodes 212 are formed. The first alignment layer 213 may be formed from a photoreactive polymer layer. A blend including a cinnamate series photoreactive polymer which includes a cinnamate group, and a polymer which is a polyimide, may be disposed on the first base substrate 211. The blend may be cured to form the photoreactive polymer layer. The ultraviolet light UV may be irradiated onto the photoreactive polymer layer to form the first alignment layer 213.

The second substrate 220 includes a second base substrate 221. A second electrode 222 is formed on the second base substrate 221. The second electrode 222 is uniformly formed on an entire lens area LA of the second base substrate 221 without using an additional patterning process. The second electrode 222 may include a transparent conductive oxide material that is substantially the same as the material used for the first electrode 212. The second electrode 222 receives substantially the same voltage from the entire lens panel 200 because the second electrode 222 is formed without using an additional patterning process.

The second alignment layer 223 is formed on the second base substrate 221. The second alignment layer 223 may be formed from a photoreactive polymer layer. A blend including a cinnamate series photoreactive polymer which includes a cinnamate group, and a polymer which is a polyimide, may be disposed on the second base substrate 221. The blend may be cured to form the photoreactive polymer layer. An ultraviolet light UV may be irradiated onto the photoreactive polymer layer to form the second alignment layer 223.

Figure 4:
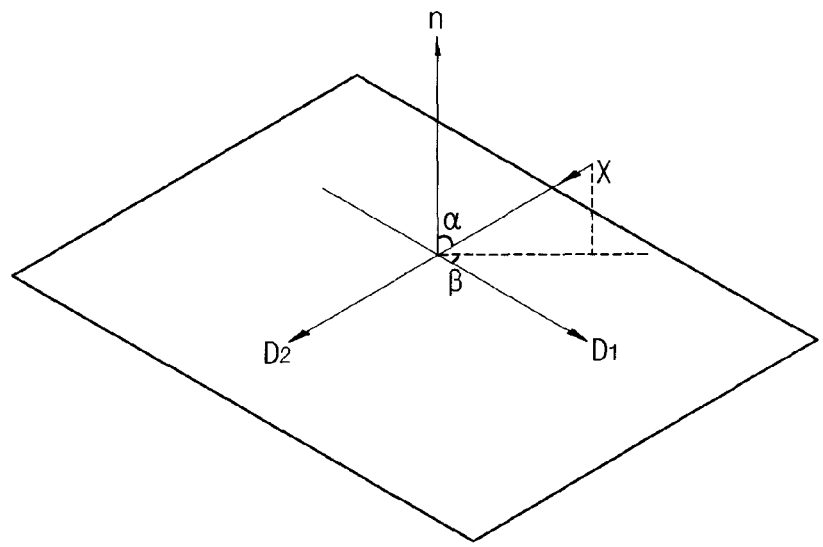
FIG. 4 is a perspective view illustrating a coordinate defining an alignment direction based on an alignment layer according to an exemplary embodiment of the present invention.

FIG. 4 is a perspective view illustrating a coordinate defining an alignment direction based on an alignment layer.

Referring to FIG. 4, a polar angle á may be defined by an angle between a normal direction n that is substantially perpendicular to the alignment layer and an alignment direction X. Thus, an exposure angle which is defined by an angle of the alignment direction X with respect to the alignment layer may be '90°−á'. An azimuth angle â is defined by an angle between a projected line of the alignment direction X and a counterclockwise direction of the first direction D1.

According to the above definition, referring to FIGS. 2, 3 and 4, the first alignment layer 213 may be aligned to have an azimuth angle '−θ' substantially parallel with the lens axis Lx, and to have a plurality of polar angles that differ from each other.

For example, the first alignment layer 213 is divided in to the alignment areas A1, A2, A3, An corresponding to the refractive areas Z1, Z2, Zn of the first lens unit LU1, with the alignment areas being aligned. The polar angles of the first alignment layer 213 increase in each of the alignment areas A1, A2, A3, An based on positions being closer to the center of the first lens unit LU1. For example, in the second alignment area A2, the polar angles of the first alignment layer 213 being closer to the third alignment area A3 is larger than that of the first alignment layer 213 being closer to the first alignment area A1. In each of the alignment areas A1, A2, A3, A4 . . . , the polar angles of the first alignment layer 213 in the discontinuous lines H1, H2, H3, H4 . . . are maximized, and the polar angles of the first alignment layer 213 further away from the discontinuous lines H1, H2, H3, H4 . . . are minimized.

The liquid crystal molecules adjacent to the first alignment layer 213 are aligned to have pre-tilt angles different from each other, because the first alignment layer 213 is aligned to have the polar angles different from each other.

The second alignment layer 223 is aligned to have an azimuth angle '90°−θ' substantially perpendicular to the lens axis Lx, and to have a plurality of polar angles substantially the same as each other.

The first alignment layer 213 and the second alignment layer 223 align liquid crystal molecules in the liquid crystal layer 230. If voltages are applied to the first electrode 212 and the second electrode 222 of the lens panel 200, an electric field is formed in the liquid crystal layer 230. The liquid crystal molecules in the liquid crystal layer 230 are aligned to have effective azimuths angles different from each other between the first substrate 210 and the second substrate 220, which causes the first lens unit LU1 to be driven as the Fresnel lens, because the liquid crystal molecules are aligned to have the pre-tilt angles different from each other.

Figure 5:
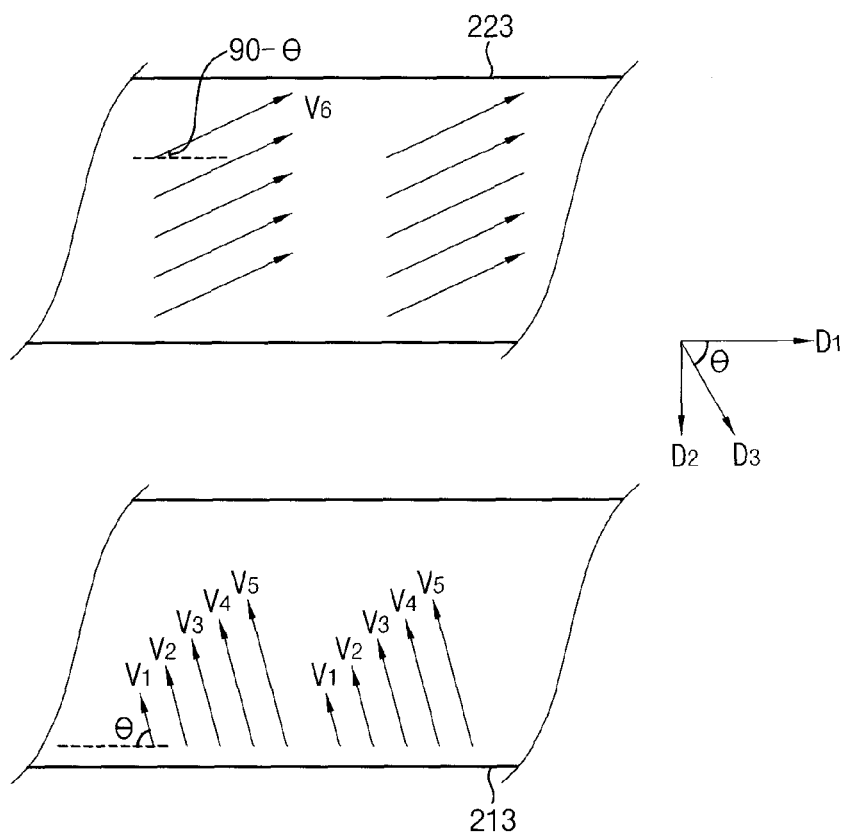
FIG. 5 is a conceptual view illustrating an alignment direction of a first alignment layer and a second alignment layer according to an exemplary embodiment of the present invention.
Figure 6:
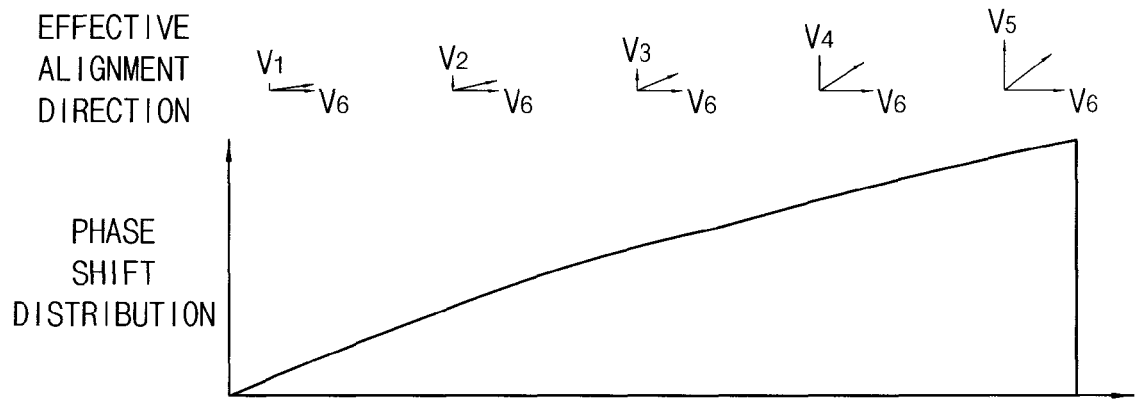
FIG. 6 is a graph illustrating an effective azimuth angle and a phase shift according to the alignment direction of a liquid crystal layer of FIG. 3 according to an exemplary embodiment of the present invention.
Figure 7:
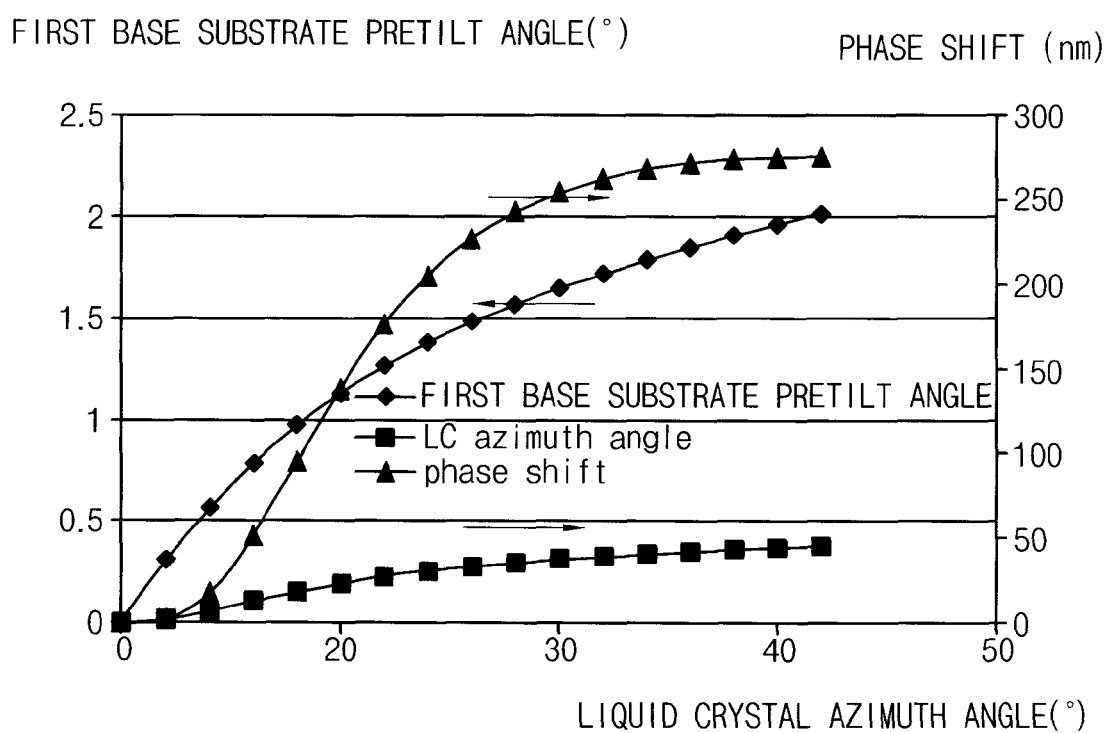
FIG. 7 is a graph illustrating an effective azimuth angle and a phase shift of the liquid crystal layer according to the alignment direction of the first alignment layer according to an exemplary embodiment of the present invention.

FIG. 5 is a conceptual view illustrating an alignment direction of a first alignment layer and a second alignment layer of FIG. 3. A size of the vector illustrated in FIG. 5 is a concept of a polar angle of an alignment direction. FIG. 6 is a graph illustrating an effective azimuth angle and phase shift according to the alignment direction of a liquid crystal layer of FIG. 3. FIG. 7 is a graph illustrating an effective azimuth angle and a phase shift of the liquid crystal layer according to the alignment direction of the first alignment layer. In FIG. 7, an azimuth angle of the alignment direction of the second alignment layer is set to about 2°.

Referring to FIGS. 3 and 5, the first alignment layer 213 is aligned to have an azimuth angle 'θ' substantially parallel with the lens axis Lx. In addition, the polar angles of the first alignment layer 213 increase in each of the alignment areas A1, A2, A3, A4 . . . according as the positions in the first alignment layer 213 are closer to the center of the first lens unit LU1. Thus, the polar angles of the first alignment layer 213 may be changed from a range between about 0° to about 2°. The polar angles of the first alignment layer 213 increases according as areas in which the polar angles are formed are closer to the discontinuous lines H1, H2, H3, H4 . . . For example, the polar angles of the first alignment layer 213 may be about 2° in the discontinuous lines H1, H2, H3, H4 . . . .

The second alignment layer 223 is aligned to have an azimuth angle '90°−θ' substantially perpendicular to the azimuth angle of the first alignment layer 213, and is aligned to have polar angles being uniform all over the second alignment layer 223. For example, the polar angles of the second alignment layer 223 may be about 2°.

If an electric field is not formed in the lens panel 200, the liquid crystal molecules of the liquid crystal layer 230 are aligned vertically with respect to the first substrate 210 and the second substrate 220.

Referring to FIGS. 3, 5, and 6, if the voltages are applied to the lens panel 200, the liquid crystal molecules are aligned according to a composition direction of vectors of the alignment directions of the first alignment layer 213 and the second alignment layer 223, and areas having phase shifts different from each other are formed in the liquid crystal layer 230.

A first vector V1 illustrates the first alignment layer 213 aligned to have a polar angle about 0.2°. A second vector V2 illustrates the first alignment layer 213 aligned to have a polar angle about 0.5°. A third vector V3 illustrates the first alignment layer 213 aligned to have a polar angle about 1°. A fourth vector V4 illustrates the first alignment layer 213 aligned to have a polar angle about 1.5°. A fifth vector V5 illustrates the first alignment layer 213 aligned to have a polar angle about 2°. A sixth vector V6 illustrates the second alignment layer 223 aligned to have a polar angle about 2°.

If the voltages are applied to the lens panel 200, the liquid crystal molecules disposed between the first vector V1 and the sixth vector V6 are aligned according to a composition direction of the first vector V1 and the sixth vector V6. Thus, an effective azimuth angle of the liquid crystal molecules between the first alignment layer 213 and the second alignment layer 223 is about 0°, and a phase shift of the liquid crystal layer 230 is about 0 nm.

If voltage is applied to the lens panel 200, the liquid crystal molecules disposed between the third vector V3 and the sixth vector V6 are aligned according to a composition direction of the third vector V3 and the sixth vector V6. Thus, an effective azimuth angle of the liquid crystal molecules between the first alignment layer 213 and the second alignment layer 223 is about 20°, and phase shift of the liquid crystal layer 230 is about 95 nm.

If the voltages are applied to the lens panel 200, the liquid crystal molecules disposed between the fifth vector V5 and the sixth vector V6 are aligned according to a composition direction of the fifth vector V5 and the sixth vector V6. Thus, an effective azimuth angle of the liquid crystal molecules between the first alignment layer 213 and the second alignment layer 223 is about 45°, and a phase shift of the liquid crystal layer 230 is about 270 nm.

Consequently, if the polar angles of the second alignment layer 223 are substantially the same with each other, the effective azimuth angle and phase shift of the liquid crystal molecules increase according as the polar angles of the first alignment layer 213 increase. Thus, when the voltages are applied to the lens panel 200, the phase shift in each alignment areas A1, A2, A3, A4 . . . . increases according as the liquid crystal molecules being closer to the center of the first lens unit LU1, and the lens panel 200 is driven as the Fresnel lens.

The lens panel 200 further includes a light blocking film 240 formed on the second substrate 220. The light blocking film 240 may be formed on a surface of the second substrate 220 opposite of a surface of the second substrate 220 on which the second alignment layer 223 is formed. If the lens panel 200 is driven for a long time, the lens panel 200 is exposed to an external light, thereby allowing the transmittance to be decreased. For example, after the lens panel 200 is exposed during about 1000 hours of sunlight, the transmittance is decreased by about 3% to 8%. The transmittance is decreased due to a change of pre-tilt angles of the first alignment layer 213 and the second alignment layer 223 by the external light. Thus, the light blocking film 240 may be formed on a surface of the second substrate 220 opposite to a surface of the second substrate 220 on which the second alignment layer 223 is formed. The light blocking film 240 may be a film absorbing the ultraviolet and short wavelength.

Alternatively, light blocking material is added to the second base substrate 221 without attaching the light blocking film 240 at an external surface. The light blocking material may include material absorbing the ultraviolet and short wavelength.

According to an exemplary embodiment, the first lens unit of the lens panel is driven as the Fresnel lens, thereby causing a cell gap of the lens panel is decreased. Thus, a manufacturing efficiency is enhanced, and a manufacturing cost is decreased.

The first electrode is entirely formed on the lens panel without using an additional patterning process, and the alignment layer is aligned to have a plurality of polar angle. Thus, the lens panel is driven as the Fresnel lens by adjusting a polar angle of the alignment layer without using an additional electrode patterning, so that reliability of the lens panel is enhanced.

In addition, the lens panel is driven by applying the same voltage to the first electrode, and the voltage is applied by an external circuit substrate without using an additional data driver. Thus a manufacturing cost is decreased.

The degradation of the alignment layer due to sunlight may be prevented by forming the light blocking film or inserting the light blocking material to the lens panel. Thus, although the lens panel is driven for long term, reliability of the lens panel is enhanced.

Figure 8:
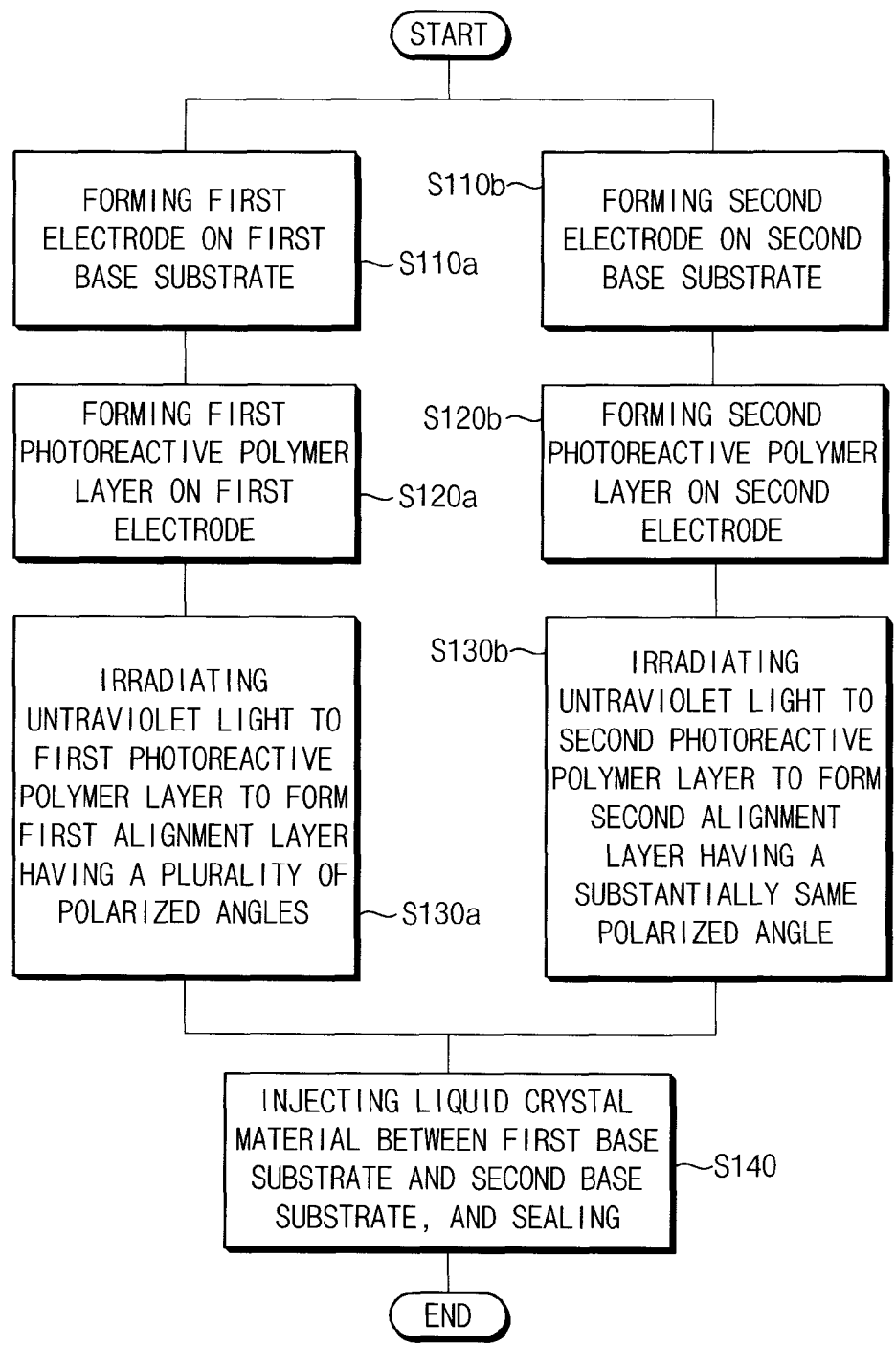
FIG. 8 is a flow chart explaining a method for manufacturing the lens panel according to an exemplary embodiment of the present invention.
Figure 9A:
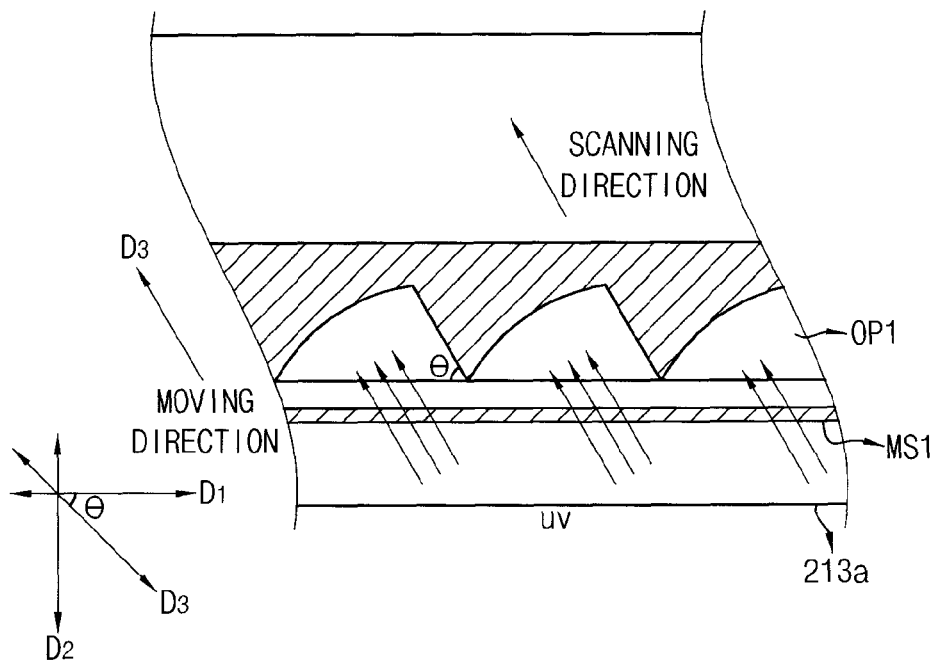
FIG. 9A is a plan view illustrating a method of aligning of the first alignment layer according to an exemplary embodiment of the present invention.
Figure 9B:
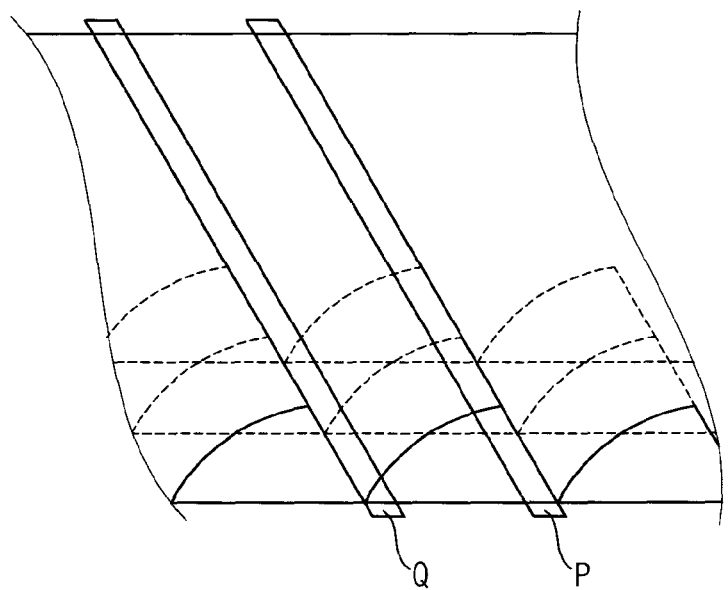
FIG. 9B is a conceptual view illustrating the amount of irradiated light according to an exemplary embodiment of the present invention.
Figure 10:
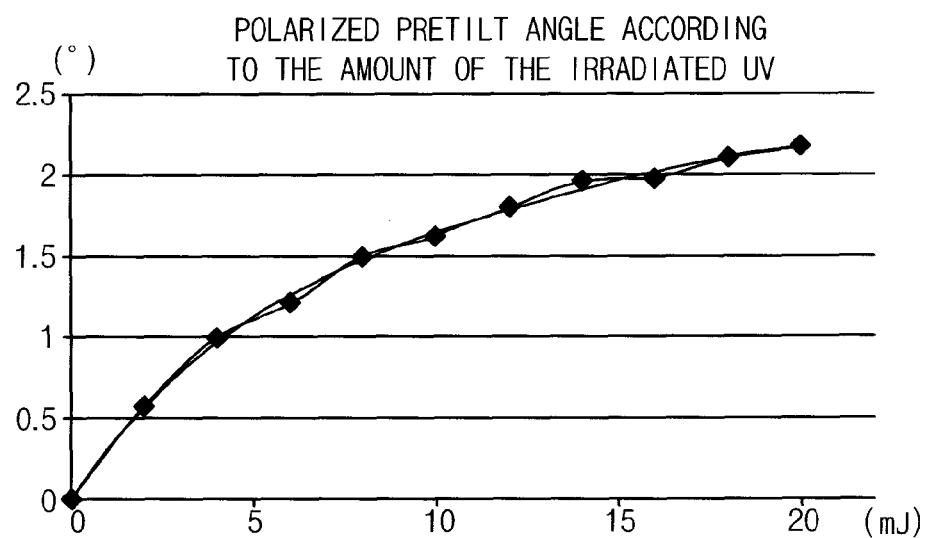
FIG. 10 is a graph illustrating a polar angle of an alignment layer according to an exemplary embodiment of the present invention.
Figure 11:
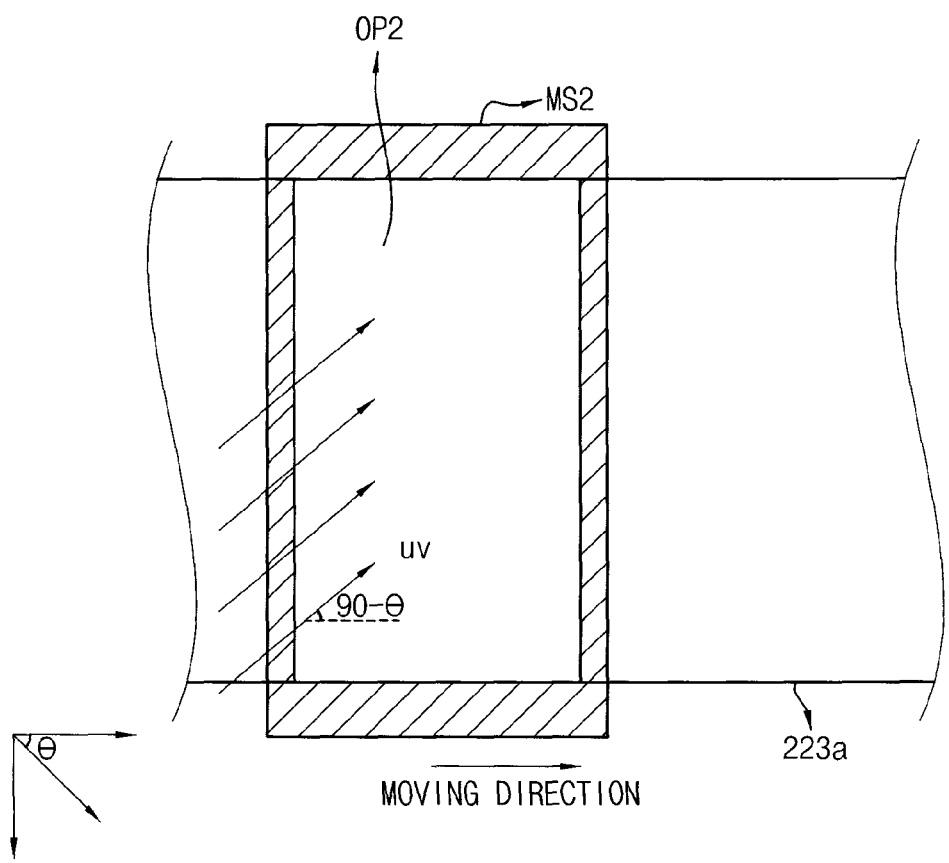
FIG. 11 is a plan view illustrating a method for aligning of the second alignment layer according to an exemplary embodiment of the present invention.

FIG. 8 is a flow chart explaining a method of manufacturing the lens panel of FIG. 3. FIG. 9A is a plan view illustrating a method of aligning of the first alignment layer of FIG. 3. FIG. 9B is a conceptual view illustrating the amount of irradiated light according to the method of aligning of FIG. 9A. FIG. 10 is a graph illustrating a polar angle of an alignment layer according to the amount of irradiated light. FIG. 11 is a plan view illustrating a method of aligning of the second alignment layer of FIG. 3.

Referring to FIGS. 3 and 8, the first electrode 212 is formed on the first base substrate 211 (S110a). The first electrode 212 may include a transparent conductive oxide material, such as indium tin oxide (ITO), indium zinc oxide (IZO) and the like. The first electrode 212 is formed by depositing the transparent conductive oxide material on the first base substrate 211.

The second electrode 222 may be formed by substantially same method with the method of forming the first electrode 212 (S110b).

A first photoreactive polymer layer is formed on the first base substrate 211 on which the first electrode 212 is formed (S120a). A blend including a cinnamate series photoreactive polymer which includes a cinnamate group, and a polymer which is a polyimide, may be disposed on the first electrode 212. The blend may be cured to form the photoreactive polymer layer.

For example, the photoreactive polymer which is the cinnamate series and the polymer which is the polyimide series may be blended at a weight ratio of about 1:9 to about 9:1 and the blend of the photoreactive polymer which is the cinnamate series and the polymer which is the polyimide series may be dissolved by an organic solvent. The blend dissolved by the organic solvent may be deposited on the first electrode 212 by a spin coating method. The blend spin-coated on the first electrode 212 may be cured to form the first photoreactive polymer layer.

A second photoreactive polymer layer is formed on the second base substrate (S120b). The second photoreactive polymer layer on the second base substrate 221 may be formed by substantially a same method with the method of forming the first photoreactive polymer layer.

Referring to FIGS. 8 and 9A, ultraviolet light UV may be irradiated onto the first photoreactive polymer layer 213a according to the polar angles to be different from each other, thereby forming the first alignment layer 213 (S130a). For example, the first base substrate 211 in which the first photoreactive polymer layer 213a is formed is disposed below a first mask MS1, and the first mask MS1 is moved along the third direction D3 by an external exposure equipment. Thus, the first base substrate 211 passes through an exposed area of the first mask MS1.

The first mask MS1 includes a plurality of exposed areas includes a plurality of circular arcs and a plurality of discontinuity lines. The circular arcs and the discontinuity lines of the exposed areas correspond to the alignment areas A1, A2, A3, A4 . . . of the first lens unit LU1. A first opening OP1 of the first mask MS1 disposed on the first alignment layer 213 in which the phase shift of the liquid crystal molecules is large, is larger than a first opening OP1 of the first mask MS1, which is disposed on a portion of the first alignment layer 213 in which the phase shift of the liquid crystal molecules is to be small. An area of the first openings OP1 increases as the first openings OP1 are closer to the center of the first lens unit LU1. The discontinuity lines are disposed to be substantially parallel with the third direction D3.

The first alignment layer 213 is aligned to have the polar angles different from each other by adjusting the amount of the ultraviolet UV irradiated onto the first photoreactive polymer layer 213a.

Referring to FIG. 10, if the amount of the ultraviolet irradiated onto the first photoreactive polymer layer 213a is about 0 mJ, the polar angle of the first alignment layer 213 is about 0°. If the amount of the ultraviolet irradiated onto the first photoreactive polymer layer 213a is about 5 mJ, the polar angle of the first alignment layer 213 is about 1.2°. If the amount of the ultraviolet UV irradiated onto the first photoreactive polymer layer 213a is about 10 mJ, the polar angle of the first alignment layer 213 is about 1.7°. Thus, the polar angle of the first alignment layer 213 increases as the amount of the ultraviolet UV irradiated onto the first photoreactive polymer layer 213a increases. This relationship is graphically represented in FIG. 10.

According to the an exemplary embodiment, the amount of the ultraviolet UV irradiated onto the first photoreactive polymer layer 213a is adjusted by changing an area of the first opening OP1 of the first mask MS1 when the amount of energy of the ultraviolet UV is irradiated onto the first photoreactive polymer layer 213a for a unit of time, and a speed of moving the first mask MS1 is fixed.

Referring to FIGS. 8, 9A and 9B, when the first mask MS1 disposed over the first base substrate 211 is moved substantially parallel with the third direction D3, the amount of the ultraviolet UV irradiated onto the first photoreactive polymer layer 213a is not uniform.

For example, when the first mask MS1 disposed over the first base substrate 211 is moved substantially parallel with the third direction D3, the amount of the ultraviolet UV irradiated onto an area P of the first photoreactive polymer layer 213a corresponding to the discontinuity line of the first mask MS1 is relatively large, and the amount of the ultraviolet UV irradiated onto an area Q of the first photoreactive polymer layer 213a corresponding to an end of the circular arc is relatively small. Thus, the polar angle of the area P of the first photoreactive polymer layer 213a corresponding to the discontinuity line of the first mask MS1 is larger than that of the area Q of the first photoreactive polymer layer 213a corresponding to an end of the circular arc.

In an exemplary embodiment, the largest polar angle of the first alignment layer 213 is about 2°, so that the largest amount of the ultraviolet UV irradiated onto the first photoreactive polymer layer 213a is about 20 mJ. The first alignment layer 213 may be formed using conventional manufacturing equipment because the polar angle of the first alignment layer 213 exists in a polar angle range of a conventional alignment layer.

The polar angles repeatedly increase and decrease, and the polar angles increase in each of the alignment areas A1, A2, A3, A4 . . . as positions in each of the alignment areas A1, A2, A3, A4 . . . are closer to the center of the first lens unit LU1.

Referring to FIGS. 8 and 11, the ultraviolet UV light may be irradiated onto the second photoreactive polymer layer 223a to form the second alignment layer 223 aligned to have substantially same polar angles (S130b). For example, the second base substrate 221 on which the second photoreactive polymer layer 223a is formed, is disposed below a second mask MS2, and the second mask MS2 is moved along the third direction D3 by an external exposure equipment. Thus, the second base substrate 221 passes through an exposed area of the second mask MS2 when the mask MS2 is moved.

The second mask MS2 may have a second opening OP2 having a square shape. The second alignment layer 223 has polar angles substantially same with each other by adjusting the amount of the UV light irradiated onto the second photoreactive polymer layer 223a to be equal.

For example, the amount of the UV light irradiated onto the second photoreactive polymer layer 223a is adjusted to be equal on second photoreactive polymer layer 223a by passing the second base substrate 221 below the second mask MS2 when the amount of energy of the ultraviolet UV irradiated onto the second photoreactive polymer layer 223a for a unit time, and a speed of moving the second mask MS2 are fixed.

Alternatively, if the amount of energy of the ultraviolet UV irradiated onto the second photoreactive polymer layer 223a is fixed, after the second photoreactive polymer layer 223a disposed below the second opening OP2 of the second mask MS2 is fully exposed by the ultraviolet UV, and then the second opening OP2 of the second mask MS2 is moved to an area where the second photoreactive polymer layer 223a is not exposed. Thus, the amount of the ultraviolet UV irradiated onto the second photoreactive polymer layer 223a is adjusted equally.

The ultraviolet UV irradiated to the second photoreactive polymer layer 223a is substantially perpendicular to the ultraviolet UV irradiated onto the first photoreactive polymer layer 213a and may be inclined at '90°−θ' with respect to the positive direction of the first direction D1. The second base substrate 221 is moved substantially parallel with the first direction D1.

The amount of the ultraviolet UV irradiated onto the second photoreactive polymer layer 223a is entirely uniform, so that the second alignment layer 223 has polar angles substantially the same with each other. For example, when the amount of the ultraviolet UV irradiated onto the second photoreactive layer 223a is about 20 mJ, the polar angle of the second alignment layer 223 is about 2°.

The liquid crystal material is injected between the first substrate 210 and the second base substrate 221, and sealed to form the lens panel 200 (S140).

According to an exemplary embodiment, the first electrode and the second electrode are formed without using an additional patterning, thereby enhancing the reliability of the lens panel. In addition, the amount of the ultraviolet irradiated is adjusted by changing the size of the openings of the mask, thereby allowing more control in the forming of the alignment layer.

In an exemplary embodiment, the amount of energy of the ultraviolet UV irradiated onto the photoreactive polymer layer for a unit time, and a speed of moving the mask are fixed, and the sizes of the openings of the mask may be changed; however, aspects of this disclosure are not limited thereto. For example, the amount of energy of the ultraviolet UV irradiated onto the photoreactive polymer layer for a unit time, a speed of moving the mask, and the shape of the opening may be changed.

Figure 12:
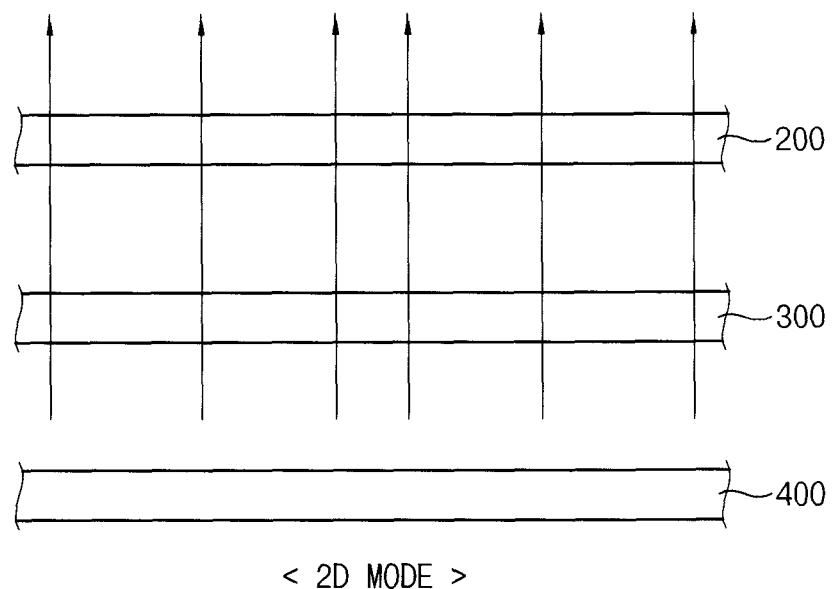
FIG. 12 is a conceptual diagram illustrating a display of a 2D image by the display apparatus according to an exemplary embodiment of the present invention.

FIG. 12 is a conceptual diagram illustrating a display of a 2D image by the display apparatus in FIG. 1.

Referring to FIGS. 1 and 12, the light source module 400 generates light. The light generated from the light source module 400 is provided to the display panel 300. Thus, the display panel 300 displays the 2D image.

The light passing through the display panel 300 is provided to the lens panel 200. In this case, the driving voltages are not provided to the lens panel 200. The liquid crystal molecules of the lens panel 200 maintain an initial alignment state, and the light passing through the display panel 300 is transmitted without refraction by the lens panel 200. Thus, the display apparatus 1000 may display the 2D image.

Figure 13:
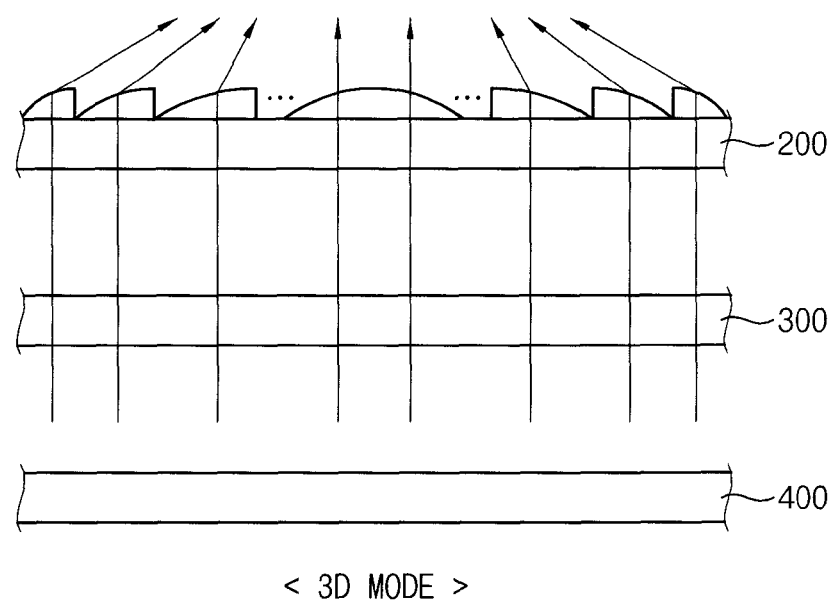
FIG. 13 is a conceptual diagram illustrating a display of a 3D stereoscopic image by the display apparatus according to an exemplary embodiment of the present invention.

FIG. 13 is a conceptual diagram illustrating a display of a 3D stereoscopic image by the display apparatus in FIG. 1.

Referring to FIGS. 1 and 13, the light source module 400 generates light. The light generated from the light source module 400 is provided to the display panel 300. Thus, the display panel 300 displays the 3D stereoscopic image. The light passing through the display panel 300 is provided to the lens panel 200. To display the 3D stereoscopic image, voltages are respectively provided to the first and second electrodes 212 and 222 of the lens panel 200.

The liquid crystal molecules of the lens panel 200 are rearranged to have a phase shift distribution like a Fresnel lens, and each of the lens units LU is driven as a Fresnel lens. Thus, the light passing through the display panel 300 is refracted by the lens panel 200. Thus, the display apparatus displays the 3D stereoscopic image, based on an effect caused by light passing through the Fresnel lens.

According to an exemplary embodiment, the first lens unit of the lens panel is driven as a Fresnel lens, so that a cell gap between lens panels is decreased. Thus, a manufacturing efficiency is enhanced, and a manufacturing cost is decreased. In addition, the amount of the UV light is adjusted by changing sizes of the openings of the mask, so that the alignment layer is easily formed.

The first electrode is entirely formed on the lens panel without using an additional patterning process, and the alignment layer is aligned to have a plurality of polar angles. Thus, the lens panel is driven as a Fresnel lens by adjusting a polar angle of the alignment layer without using an additional electrode patterning, so that reliability of the lens panel is enhanced.

In addition, the lens panel is driven by applying the same voltage to the first electrode, the voltage is applied by an external circuit substrate without additional data driver, so that the manufacturing cost is decreased.

Figure 14:
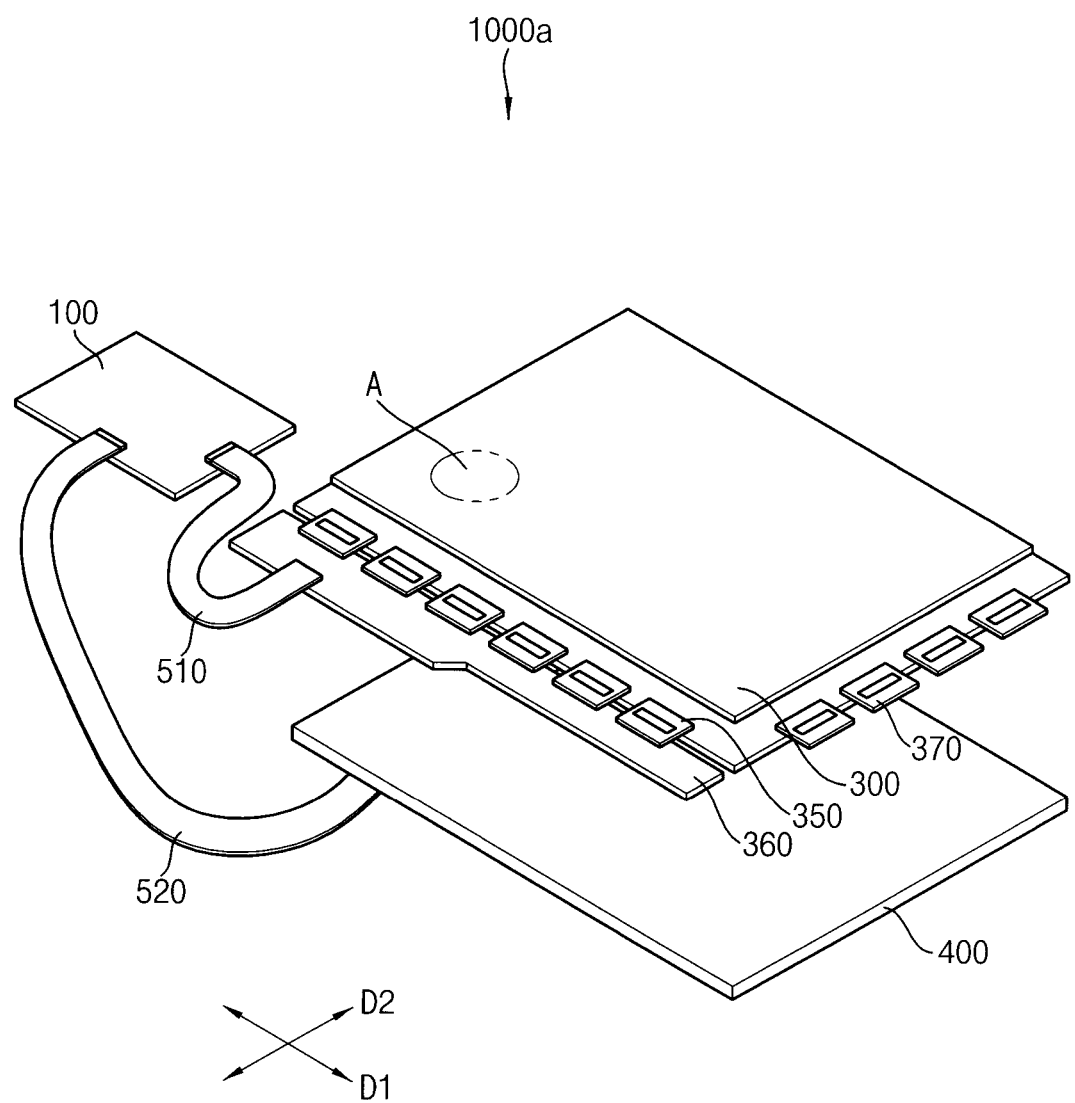
FIG. 14 is a perspective view illustrating a display apparatus according to an exemplary embodiment of the present invention.

FIG. 14 is a perspective view illustrating a display apparatus according to another example embodiment of the present invention.

A display apparatus according to the according to the present example embodiment is substantially the same as the display apparatus previous described in this disclosure, except for the lens panel and the display panel, and thus, the same reference numerals will be used to refer to the same or like parts as those described earlier.

Referring to FIG. 14, a display apparatus 1000a includes a controller 100, a display panel 300 and a light source module 400.

The controller 100 adjusts a gray-scale of the panel module based on an image displayed by the display apparatus 1000a. For example, if the display apparatus 1000a displays an image having a black gray-scale, the controller applies a relatively low voltage to the display panel 300. If the display apparatus 1000a displays an image having a white gray-scale, the controller applies a relatively high voltage to the display panel 300.

If the voltage is applied to the display panel, the display panel forms a GRIN lens. A refractive index of the GRIN lens gradually changes according to a distance from an axis of the GRIN lens, and the refractive index of the display panel is gradually changed according to the voltage. Thus, light passing through the light source module 400 is refracted by the display panel 300. Therefore, the light refracted by the display panel 300 is blocked by a light blocking pattern of the display panel 300, and is perceived as a 3D image by an observer.

Figure 15:
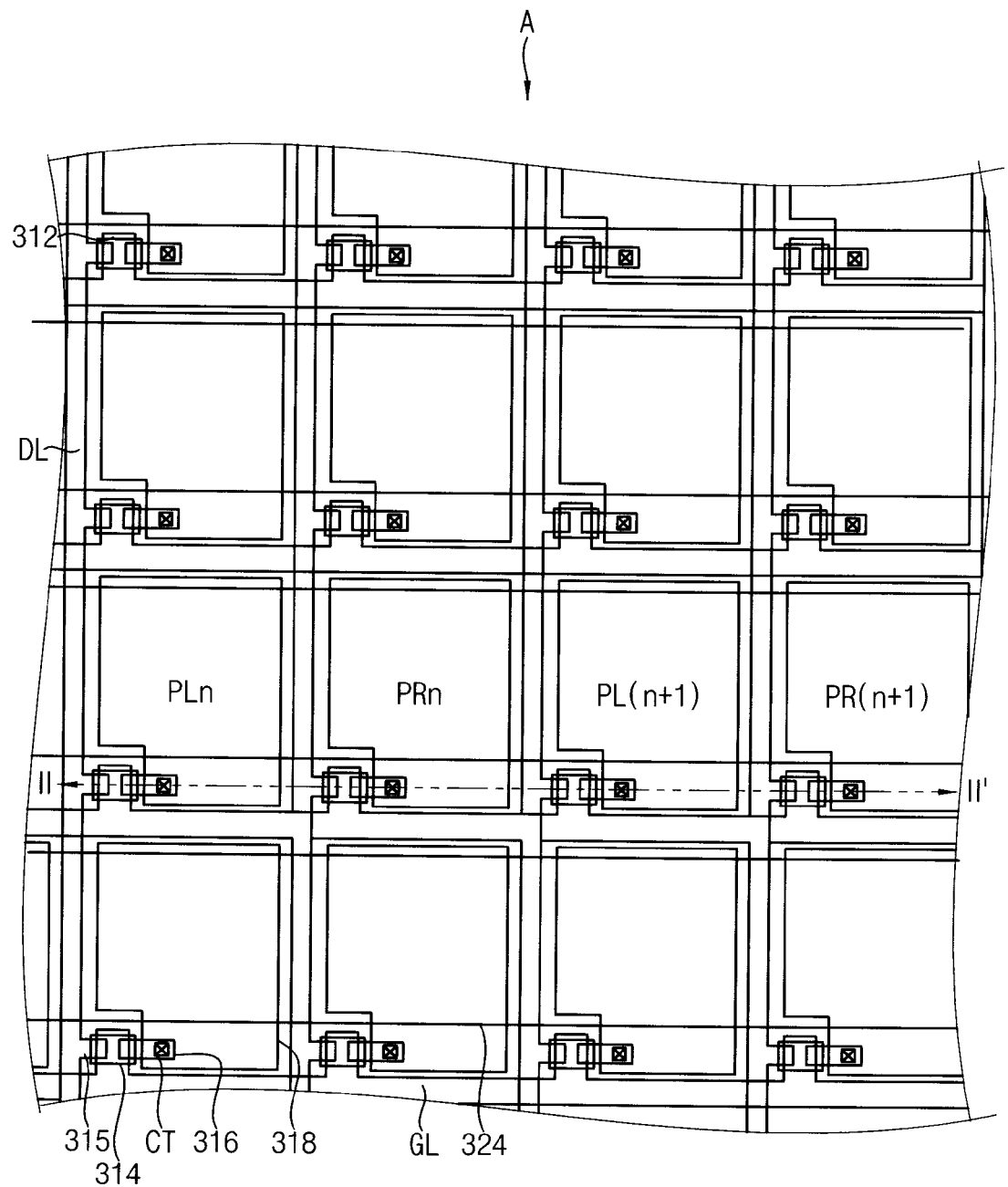
FIG. 15 is an enlarged plan view of a portion 'A' in FIG. 14 according to an exemplary embodiment of the present invention.
Figure 16:
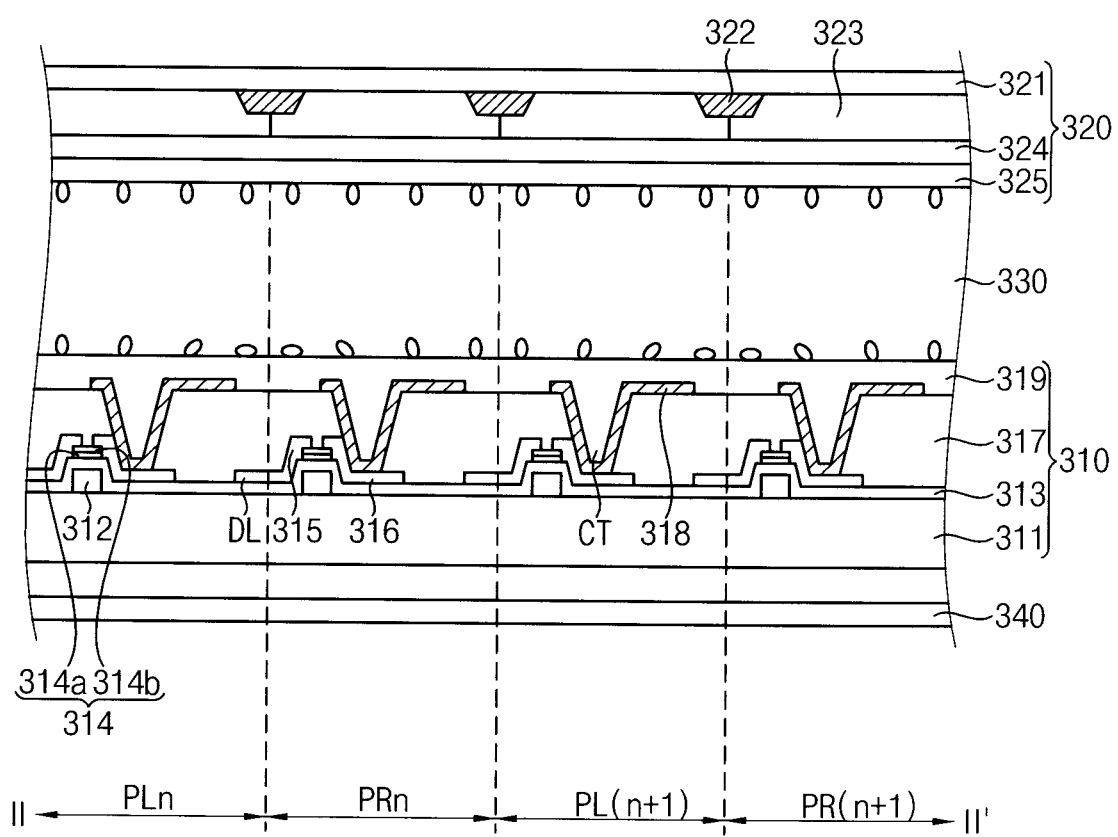
FIG. 16 is a cross-sectional view taken along a line II-IF of FIG. 15 according to an exemplary embodiment of the present invention.

FIG. 15 is an enlarged plan view of a portion 'A' in FIG. 14. FIG. 16 is a cross-sectional view taken along a line II-II' of FIG. 15.

Referring to FIGS. 15 and 16, the display panel 300 includes a first display substrate 310, a second display substrate 320 facing the first display substrate 310, and the liquid crystal layer 330 disposed between the first display substrate 310 and the second display substrate 320. In an exemplary embodiment, liquid crystal material has negative permittivity, and is aligned vertically when electric field is not applied. However, not limited thereto, another liquid crystal material may be used.

The first display substrate 310 includes a plurality of gate lines GL, a plurality of data lines DL and a plurality of pixels P. The gate lines extend along a first direction D1. The data lines DL extend along a second direction D2 crossing the first direction D1. The first direction D1 and the second direction D2 may be orthogonal. Each of the pixels P includes a pixel electrode 318. The pixel P is defined by an area in which, the data lines DL and the gate lines GL cross and the pixel electrode 318 is formed. Each of the pixels P includes a switching element. The switching element includes a gate electrode 312, a semiconductor layer 314, a source electrode 315 and a drain electrode 316.

The pixels P include a left-eye pixel PL and a right-eye pixel PR. The left-eye pixel PL and the right-eye pixel PR are alternately arranged along the first direction D1. The left-eye pixel PL and the right-eye pixel PR adjacent to each other form a second lens unit LU2. When the display panel 300 receives a voltage, the second lens unit LU2 is driven as the GRIN lens, and light passing through the light source module 400 is refracted by the second lens unit LU2. The light refracted by the second lens unit LU2 is blocked by the light blocking pattern 322 of the second display substrate 320, or passes through the second display substrate 320 to be perceived by the observer. The display panel 300 adjusts the gray-scale according to the amount of the light blocked by the light blocking pattern 322.

If the display apparatus 1000a displays a 2D image, the display panel 300 is driven by applying substantially a same image signal to both the left-eye pixel PL and the right-eye pixel PR. If the display apparatus 1000a displays a 3D stereoscopic image, the display panel 300 is driven by converting an image in the controller 100 and applying image signals that are different from each other to the left-eye pixel PL and the right-eye pixel PR.

The first display substrate 310 includes a first display base substrate 311. The gate line GL and the gate electrode 312 are formed on the first display base substrate 311. The gate lines GL extend along the first direction D1. The gate electrode 312 protrudes from the gate line GL, and is disposed on the pixel P The gate insulating layer 313 is formed on the first display base substrate 311. The gate insulating layer 313 may include an insulating material that transmits light. Examples of the insulating material may include silicon nitride, silicon oxide and the like.

The semiconductor layer 314 is formed on the gate insulating layer 313. The semiconductor layer 314 includes an amorphous silicon pattern 314a and an n+ amorphous silicon pattern 314b. The semiconductor layer 314 overlaps with the gate electrode 312.

The data lines DL, the source electrode 315 and the drain electrode 316 are formed on the gate insulating layer 313. The data lines DL extend along the second direction D2. Each of the source electrode 315 and the drain electrode 316 partially overlaps with the semiconductor layer 314. The source electrode 315 and the drain electrode 316 are separated from each other. The source electrode 315 protrudes from the data line DL.

The organic layer 317 is formed on the first display base substrate 311 on which the data lines DL, the source electrode 315 and the drain electrode 316 are formed. The organic layer 317 covers the source electrode 315, the drain electrode 316, the data lines DL and the semiconductor layer 314. The organic layer 317 includes a contact hole CT exposing the drain electrode 316. The organic layer 317 may include an insulating material that transmits light. Examples of the insulating material may include silicon nitride, silicon oxide and the like.

The pixel electrode 318 is formed on the first display base substrate 311. The pixel electrode 318 may include a transparent conductive oxide material. Examples of the transparent conductive oxide material may include indium tin oxide (ITO), indium zinc oxide (IZO) and so on. The pixel electrode 318 is connected to the drain electrode 316 through the contact hole CT.

The third alignment layer 319 is formed on the first display base substrate 311. The third alignment layer 319 is formed from a photoreactive polymer layer. A blend including a cinnamate series photoreactive polymer which includes a cinnamate group, and a polymer which is a polyimide, may be disposed on the first display base substrate 311. The blend may be cured to form the photoreactive polymer layer. The ultraviolet light UV may be irradiated onto the photoreactive polymer layer to form the third alignment layer 319.

The third alignment layer 319 is aligned by a pixel P unit. In each pixel P, polar angles of the third alignment layer 319 of the pixels P adjacent to each other are symmetric. In addition, the polar angles of the left-eye pixel PL and the right-eye pixel PR adjacent to each other may symmetrically change with respect to a boundary between the left-eye pixel PL and the right-eye pixel PR.

For example, if the polar angles of the n-th left-eye pixel PLn of the third alignment layer 319 increase as the position of the n-th left-eye pixel PLn are further away from the switching element of the n-th left-eye pixel PLn, the polar angles of the n-th right-eye pixel PRn of the third alignment layer 319 decrease as the position of the n-th right-eye pixel PRn are further away from the switching element of the n-th right-eye pixel PRn. The left-eye pixel PL and the right-eye pixel PR aligned by the above method are alternately arranged on the display panel 300.

The liquid crystal molecules adjacent to the third alignment layer 319 are aligned to have pre-tilt angles different from each other, because the third alignment layer 319 has the polar angles that differ from each other.

An azimuth angle of the third alignment layer 319 is substantially same overall in the third alignment layer 319, and may be about 90°.

The light blocking pattern 322 is formed on a second display base substrate 321. The light blocking pattern 322 is formed in an area corresponding to the gate line GL and the data line DL. Thus, the light blocking pattern 322 blocks all or a portion of the light passing through the light emitting module 400 and the liquid crystal layer 330 to adjust the gray-scale of the display panel 300.

A color filter 323 is formed on the second display base substrate 321 on which the light blocking pattern 322 is formed. The color filter 323 may include a red color filter, a green color filter and a blue color filter. According to the present example embodiment, the color filters 323 having substantially the same color are arranged along the first direction D1, and the color filters 323 having an order of the red color, the green color and the blue color are repeatedly arranged along the second direction D2.

Alternatively, the color filters 323 having an order of the red color, the green color and the blue color are repeatedly arranged along the first direction D1, and the color filters 323 having substantially the same color are arranged along the second direction D2.

A common electrode 324 is formed on the second display base substrate 321. The common electrode 324 may include a transparent conductive oxide material. Examples of the transparent conductive oxide material may include indium tin oxide (ITO), indium zinc oxide (IZO) and so on. If a voltage is applied to the display panel 300, the common electrode 324 and the pixel electrode 318 form an electric field to arrange the liquid crystal molecules of the liquid crystal layer 330.

A fourth alignment layer 325 is formed on the second display base substrate 321. The fourth alignment layer 325 is formed from a photoreactive polymer layer. A blend including a cinnamate series photoreactive polymer which includes a cinnamate group, and a polymer which is a polyimide, may be disposed on the second display base substrate 321. The blend may be cured to form the photoreactive polymer layer. The ultraviolet light UV may be irradiated onto the photoreactive polymer layer to form the fourth alignment layer 325.

The fourth alignment layer 325 is uniformly formed on the second display base substrate 321.

In addition, the polar angles of the left-eye pixel PL and the right-eye pixel PR adjacent to each other may symmetrically change with respect to a boundary between the left-eye pixel PL and the right-eye pixel PR.

An azimuth angle of the fourth alignment layer 325 is substantially same in the fourth alignment layer 325, and may be about 0° perpendicular to the azimuth angle of the third alignment layer 319.

The liquid crystal molecules of the liquid crystal layer 330 are aligned by the third alignment layer 319 and the fourth alignment layer 325. If voltages are applied to the pixel electrode 318 and the common electrode 324 of the display panel 300, an electric field is formed in the liquid crystal layer 330. The liquid crystal molecules in the liquid crystal layer 330 are aligned to have effective azimuth angles different from each other between the first display substrate 310 and the second display substrate 320, because the liquid crystal molecules are aligned to have pre-tilt angles different from each other on the first display substrate 310. Each of the azimuth angles of each pixel P may be different from each other due to the voltage applied to each pixel P. Thus, phase shifts of each pixel P may be different from each other.

Figure 17:
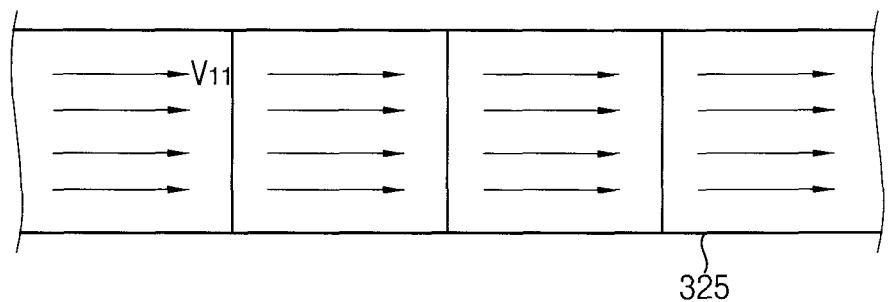
FIG. 17 is a conceptual view illustrating an alignment direction of a third alignment layer and a fourth alignment layer of FIG. 16 according to an exemplary embodiment of the present invention.
Figure 17:
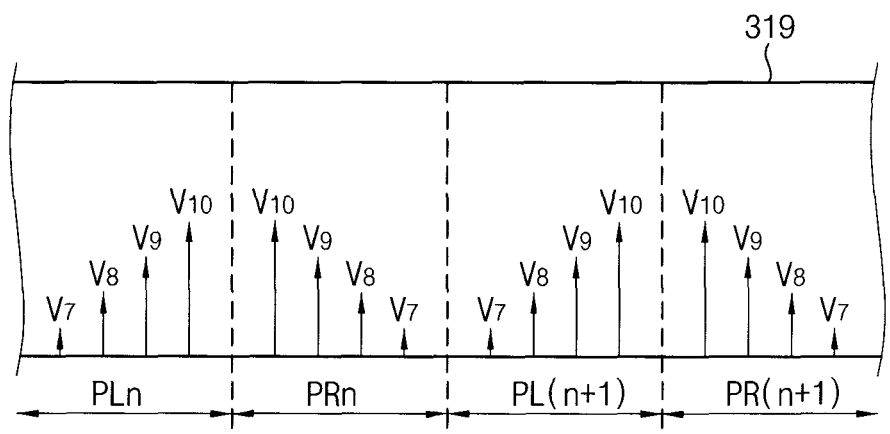

FIG. 17 is a conceptual view illustrating an alignment direction of a third alignment layer and a fourth alignment layer of FIG. 16. A size of the vector illustrated in FIG. 17 is a concept of a polar angle of an alignment direction.

Referring to FIG. 17, the azimuth angle of the third alignment layer 319 is about '−90°' substantially parallel to a negative direction of the second direction D2. In addition, in each pixel P, the polar angles of the third alignment layer 319 of the pixels P adjacent to each other are symmetric. For example, the polar angles of the third alignment layer 319 are changed between about 0° to about 2°. In the n-th left-eye pixel PLn, when the polar angle of the third alignment layer 319 on the switching element is about 0°, the polar angle of the third alignment layer 319 in an area adjacent to the n-th right-eye pixel PRn is about 2°. In the n-th right-eye pixel PRn, when the polar angle of the third alignment layer 319 on the switching element is about 2°, the polar angle of the third alignment layer 319 in an area adjacent to the (n+1)-th left-eye pixel PL(n+1) is about 0°. The left-eye pixel PL and the right-eye pixel PR aligned by the above method are alternately arranged on the display panel 300.

If the electric field is not formed in the display panel, the liquid crystal molecules of the liquid crystal layer 330 are aligned vertically with respect to the first display substrate 310 and the second display substrate 320.

Figure 18:
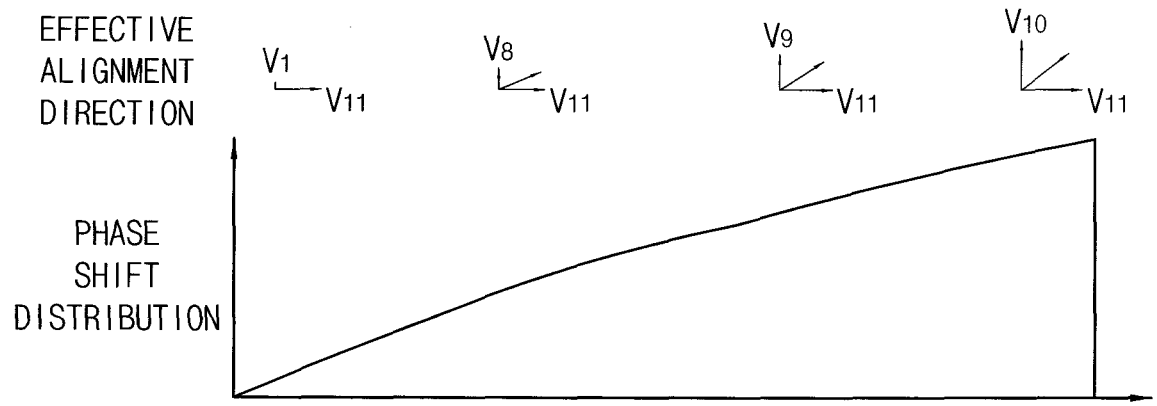
FIG. 18 is a graph illustrating an effective azimuth angle and a phase shift according to the alignment direction of a liquid crystal layer according to an exemplary embodiment of the present invention.

FIG. 18 is a graph illustrating an effective azimuth angle and a phase shift according to the alignment direction of a liquid crystal layer of FIG. 15. In the present example embodiment, an effective azimuth angle and a phase shift of the liquid crystal layer according to the alignment direction of the first alignment layer is substantially same with FIG. 7.

Referring to FIGS. 16, 17 and 18, when the voltages are applied to the display panel 300, the liquid crystal molecules are aligned according to a composition direction of vectors of the alignment directions of the third alignment layer 319 and the fourth alignment layer 325, and areas having phase shifts different from each other are formed in the liquid crystal layer 330.

A seventh vector V7 illustrates the third alignment layer 319 aligned to have a polar angle about 0.2°. An eighth vector V8 illustrates the third alignment layer 319 aligned to have a polar angle about 0.5°. A ninth vector V9 illustrates the third alignment layer 319 aligned to have a polar angle about 1°. A tenth vector V10 illustrates the third alignment layer 319 aligned to have a polar angle about 2°. An eleventh vector V11 illustrates the fourth alignment layer 325 aligned to have a polar angle about 2°.

Referring to FIGS. 17 and 18, when the voltages are applied to the display panel 300, the liquid crystal molecules disposed between the seventh vector V7 and the eleventh vector V11 are aligned according to a composition direction of the seventh vector V7 and the eleventh vector V11. Thus, an effective azimuth angle of the liquid crystal molecules between the third alignment layer 319 and the fourth alignment layer 325 is about 0°, and phase shift of the liquid crystal layer 330 is about 0 nm.

If voltage is applied to the display panel 300, the liquid crystal molecules disposed between the ninth vector V9 and the eleventh vector V11 are aligned according to a composition direction of the ninth vector V9 and the eleventh vector V11. Thus, an effective azimuth angle of the liquid crystal molecules between the third alignment layer 319 and the fourth alignment layer 325 is about 20°, and phase shift of the liquid crystal layer 230 is about 95 nm.

If voltage is applied to the display panel 300, the liquid crystal molecules disposed between the tenth vector V10 and the eleventh vector V11 are aligned according to a composition direction of the tenth vector V10 and the eleventh vector V11. Thus, an effective azimuth angle of the liquid crystal molecules between the third alignment layer 319 and the fourth alignment layer 325 is about 45°, and phase shift of the liquid crystal layer 330 is about 270 nm.

A polarizer 340 is formed below the display panel 300. The polarizer 340 polarizes a light provided from the light emitting module 400 for the display panel 300.

The display panel 300 further includes an optical diffusion film (not shown). The optical diffusion film may be formed at a surface of the first substrate opposite to a surface of the first substrate on which the fourth alignment layer 325 is formed. The light passing through the liquid crystal layer 330 is focused by the display panel 300 and driven as the Gradient-index optics (GRIN) lens to be refracted. GRIN optics is a branch of optics covering optical effects produced by a gradual variation of the refractive index of a material. Such variations can be used to produce lenses with flat surfaces, or lenses that do not have the aberrations typical of traditional spherical lenses. Gradient-index lenses may have a refraction gradient that is spherical, axial, or radial. Because, the light provided from the light emitting module 400 is focused by passing the liquid crystal layer 330, a viewing angle of a left side and a right side of the display panel 300 may be narrow. The optical diffusion film prevents the viewing angle of a left side and a right side of the display panel 300 from being narrow. The optical diffusion film may be formed by attaching on the second display substrate 320 as a film shape, or may be formed by deposing an optical diffusion material on the second display substrate 320. Alternatively, the optical diffusion film may be formed by injecting the optical diffusion material in an upper part of the second display substrate 320, or may be formed by mixing the optical diffusion material with the color filter 323.

According to an exemplary embodiment, the third alignment layer has a plurality of polar angles different from each other. Thus, the gray-scale of the display panel is adjusted by the polar angles of the third alignment layer and a light blocking pattern, and the display panel does not use an upper polarizer.

Therefore, the viewing angle dependence decreases, and transmittance increases. In addition, the first display substrate and the second display substrate are formed by one alignment, respectively, so that a manufacturing efficiency is enhanced.

If the display apparatus displays the 3D stereoscopic image, the display panel is used as lens to refract the image, and the view point is adjusted using the light blocking pattern, so that the 3D stereoscopic image is displayed using a barrier type and a lenticular type.

Figure 19:
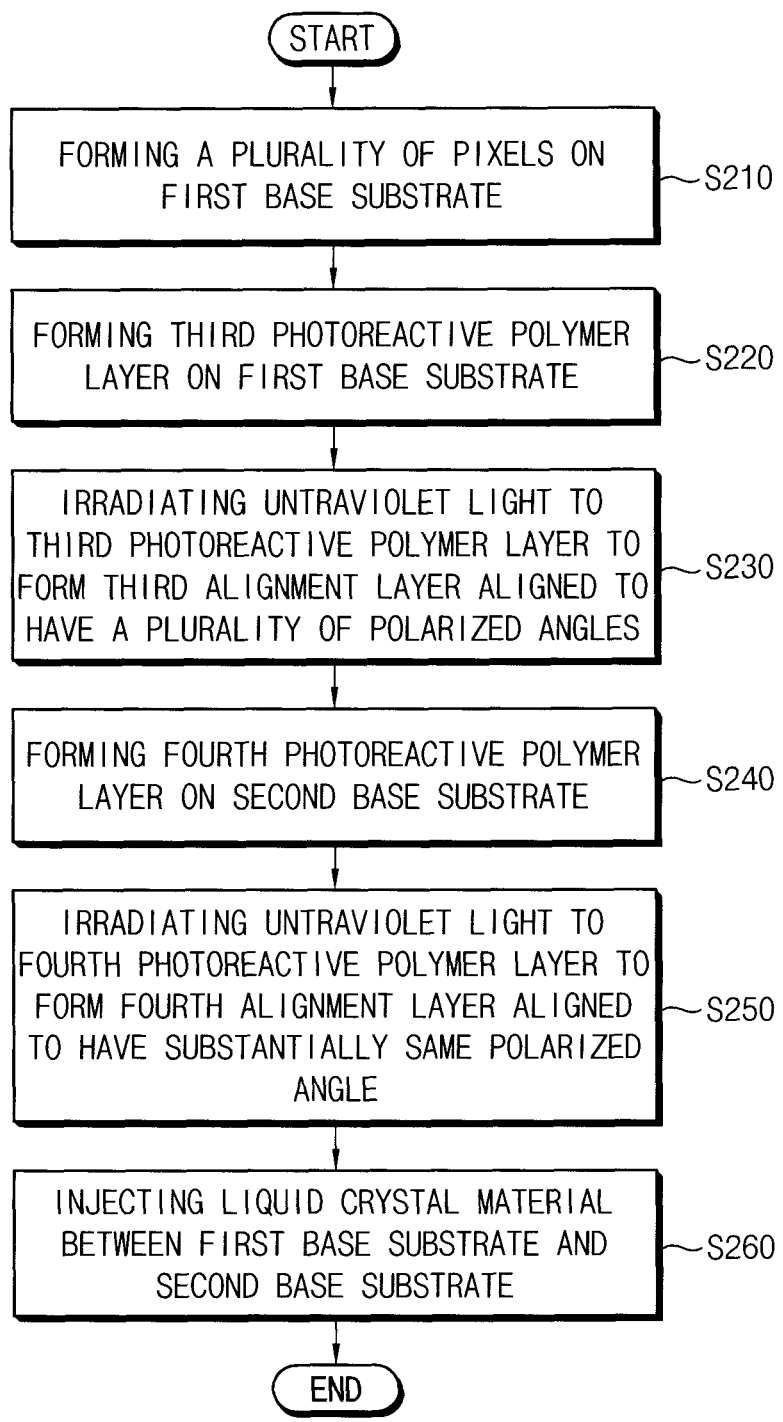
FIG. 19 is a flow chart explaining a method for manufacturing a lens panel according to an exemplary embodiment of the present invention.
Figure 20A:
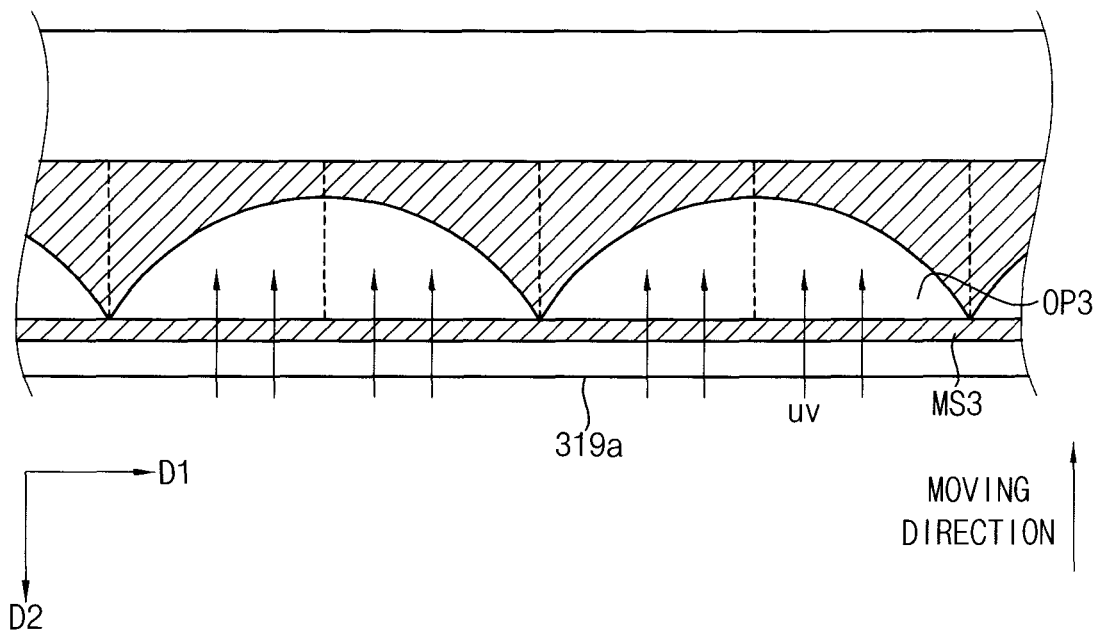
FIG. 20A is a plan view illustrating a method of aligning of the third alignment layer of FIG. 16 according to an exemplary embodiment of the present invention.
Figure 20B:
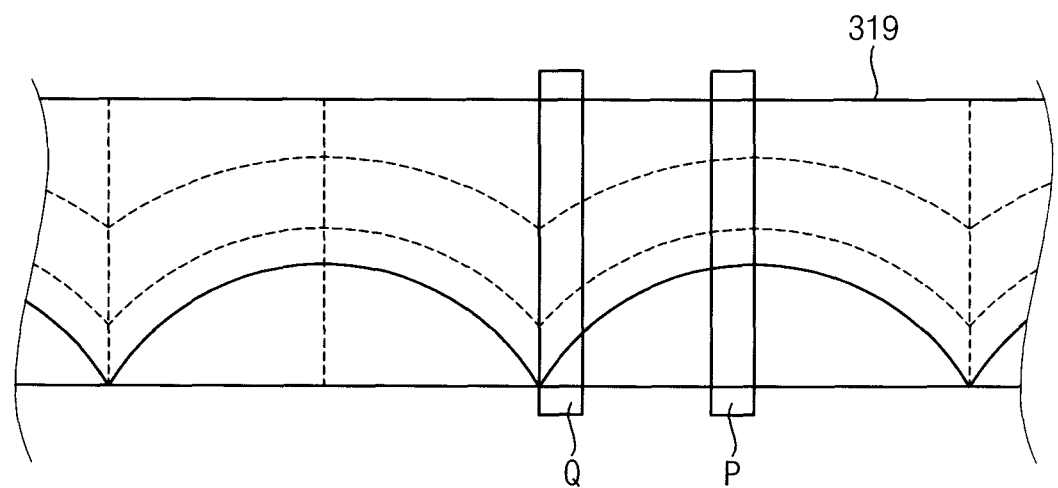
FIG. 20B is a conceptual view illustrating the amount of irradiated light according to the method for aligning according to an exemplary embodiment of the present invention.

FIG. 19 is a flow chart explaining a method of manufacturing the lens panel of FIG. 14. FIG. 20A is a plan view illustrating a method of aligning of the third alignment layer of FIG. 16. FIG. 20B is a conceptual view illustrating the amount of irradiated light according to the method of aligning of FIG. 20A.

Referring to FIGS. 16 and 19, the pixels P are formed on the first display base substrate 311 using any suitable method (S210). Each of the pixels P includes the switching element and the pixel electrode 318. The pixels P are defined by the data line DL and the gate line GL. In addition, the gate insulating layer 313 and the organic layer 317 are formed on the first display base substrate 311.

A third photoreactive polymer layer is formed on the first display base substrate 311 (S220). The third photoreactive polymer layer may be formed by substantially same method as the method of forming the first photoreactive polymer layer illustrated in FIG. 8.

Referring to FIGS. 19 and 20A, ultraviolet light UV may be irradiated onto the third photoreactive polymer layer 319a to form the third alignment layer 319 (S230). For example, the first display base substrate 311 in which the third photoreactive polymer layer 319a is formed is disposed below a third mask MS3, and the third mask MS3 is moved along the second direction D2 by an external exposure equipment. Thus, the first display base substrate 311 passes through an exposed area of the third mask MS3.

The third mask MS3 includes a plurality of third openings OP3. Each of the third openings OP3 may correspond to a pair of the left-eye pixel PL and the right-eye pixel PR adjacent to the left-eye pixel PL. The third mask MS3 may have a semicircular shape. One of the third openings OP3 of the third mask MS3 disposed on the third alignment layer 213 in which the phase shift of the liquid crystal molecules is large, is larger than another one of the third openings OP3 of the third mask MS3 disposed on the third alignment layer 319 in which the phase shift of the liquid crystal molecules is small. For example, in the left-eye pixel PL, if the polar angles of the left-eye pixel PL of the third alignment layer 319 increases according as positions in the left-eye pixel PL being further away from the switching element of the left-eye pixel PL, an area of the third opening OP3 disposed over the left-eye pixel PL also increases. In addition, if the polar angles of the right-eye pixel PR of the third alignment layer 319 decreases according as positions in the right-eye pixel PR are further away from the switching element of the right-eye pixel PR, a size of the third opening OP3 disposed over the right-eye pixel PR also decreases.

The third alignment layer 319 is aligned to have the polar angles that differ from each other by adjusting the amount of the ultraviolet UV irradiated onto the third photoreactive polymer layer 319a.

Referring to FIGS. 19 and 20A, because the third opening OP3 of the third mask MS3 has the semicircle shape, when the third mask MS3 disposed over the first display base substrate 311 is moved substantially parallel with the second direction D2, the amount of UV light irradiated onto the third photoreactive polymer layer 319a is not uniform all over the third photoreactive polymer layer 319a.

For example, when the third mask MS3 disposed over the third display base substrate 311 is moved substantially parallel with the second direction D2, the amount of the ultraviolet UV irradiated onto an area P of the third photoreactive polymer layer 319a is relatively large, and the amount of the ultraviolet UV irradiated onto an area Q of the third photoreactive polymer layer 319a is relatively small. Thus, the polar angle of the area P of the third photoreactive polymer layer 319a is larger than that of the area Q of the third photoreactive polymer layer 319a.

In an exemplary embodiment, the largest polar angle of the third alignment layer 319 is about 2°, so that the largest amount of the ultraviolet UV irradiated onto the third photoreactive polymer layer 319a is about 20 mJ. The third alignment layer 319 may be formed using conventional manufacturing equipment because the polar angle of the third alignment layer 319 exists in a polar angle range of a conventional alignment layer.

If the polar angles repeatedly increase and decrease and the polar angles of the n-th left-eye pixel PLn increase according to positions of the n-th left-eye pixel PLn are further away from the switching element of the n-th left-eye pixel PLn, the polar angles of the n-th right-eye pixel PRn also increase according to positions of the n-th right-eye pixel PRn being further away from the switching element of the n-th right-eye pixel PRn.

A fourth photoreactive polymer layer 325a is formed on the second display base substrate 321 (S240). The fourth photoreactive polymer layer 325a may be formed by substantially the same method as the method of forming the third photoreactive polymer layer 319a.

The ultraviolet light UV may be irradiated onto the fourth photoreactive polymer layer 325a to form the fourth alignment layer 325, which is aligned to have the polar angles substantially being the same as each other (S250). The fourth alignment layer 325 may be formed by substantially same method as the method of forming the second alignment layer illustrated in FIG. 8.

According to an exemplary embodiment, the third alignment layer is aligned to have a plurality of polar angles that differ from each other. Thus, the gray-scale of the display panel is adjusted by the polar angles of the third alignment layer and a light blocking pattern, and an upper polarizer is not utilized.

Therefore, this allows the viewing angle dependence to decrease, and the transmittance to increase. In addition, each of the first display substrate and the second display substrate is formed by one alignment, thereby allowing a manufacturing efficiency to be enhanced.

In addition, the amount of the ultraviolet is adjusted by changing areas of the openings of the mask, so that the alignment layer is easily formed.

In an exemplary embodiment, the amount of energy of the ultraviolet UV irradiated onto the photoreactive polymer layer for a unit time, and a speed of moving the mask are fixed, and the sizes of the openings of the mask are changed, but aspects of this disclosure are not limited thereto. For example, the amount of energy of the ultraviolet UV irradiated onto the photoreactive polymer layer for a unit time, a speed of moving the mask, and the shape of the opening may be changed.

Figure 21:
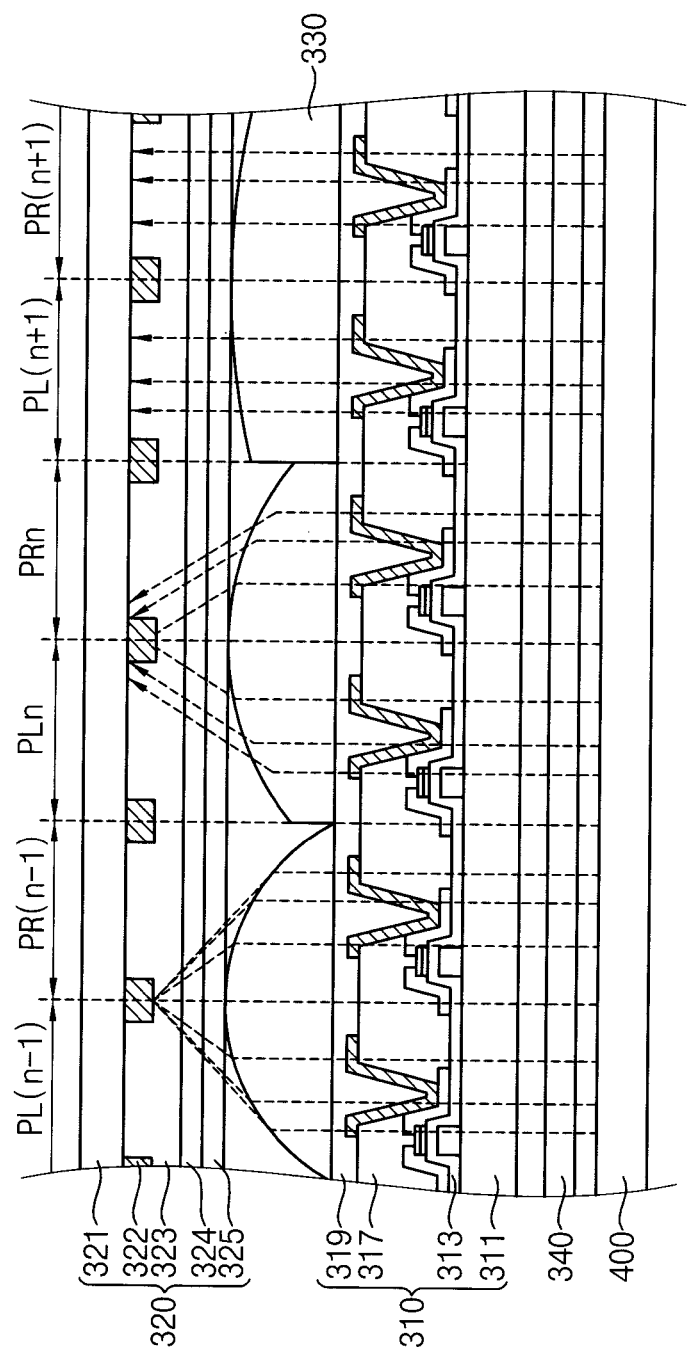
FIG. 21 is a conceptual diagram illustrating a display of an image according to an exemplary embodiment of the present invention.

FIG. 21 is a conceptual diagram illustrating a display of an image by the display apparatus in FIG. 14.

Referring to FIGS. 14 and 21, a light source module 400 is provided to generate light, the light being provided to the display panel 300. This allows the display panel 300 to display the 3D stereoscopic image. At this time, the display panel 300 receives a voltage. The liquid crystal molecules of the display panel 300 are rearranged according to the voltage.

For example, the (n−1)-th left-eye pixel PL(n−1) and the (n−1)-th right-eye pixel PR(n−1) display a black gray-scale, the n-th left-eye pixel PLn and the n-th right-eye pixel PRn display a middle gray-scale between the black gray-scale and a white gray-scale, and the (n+1)-th left-eye pixel PL(n+1) and the (n+1)-th right-eye pixel PR(n+1) display the white gray-scale. Hereinafter, N is a natural number.

A first voltage is applied to the pixel electrode 318 of the (n−1)-th left-eye pixel PL(n−1) and the (n−1)-th right-eye pixel PR(n−1). An effective azimuth angle of the liquid crystal layer 330 is maximum at a center between the (n−1)-th left-eye pixel PL(n−1) and the (n−1)-th right-eye pixel PR(n−1), and the effective azimuth angle of the liquid crystal layer 330 decreases as positioned farther away from the center between the (n−1)-th left-eye pixel PL(n−1) and the (n−1)-th right-eye pixel PR(n−1). For example, the effective azimuth angle of the liquid crystal layer 330 may be about 2° at the center between the (n−1)-th left-eye pixel PL(n−1) and the (n−1)-th right-eye pixel PR(n−1), and the effective azimuth angle of the liquid crystal layer 330 may be about 0° at ends of the (n−1)-th left-eye pixel PL(n−1) and the (n−1)-th right-eye pixel PR(n−1). Thus, the phase shift of the light passing through the liquid crystal layer 330 in the (n−1)-th left-eye pixel PL(n−1) and the (n−1)-th right-eye pixel PR(n−1) is maximized, and the light passing through the liquid crystal layer 330 in the (n−1)-th left-eye pixel PL(n−1) and the (n−1)-th right-eye pixel PR(n−1) is refracted to be focused onto the light blocking pattern 322. Therefore, most of the light passing through the liquid crystal layer 330 in the (n−1)-th left-eye pixel PL(n−1) and the (n−1)-th right-eye pixel PR(n−1) does not pass the second display substrate 320, so that the (n−1)-th left-eye pixel PL(n−1) and the (n−1)-th right-eye pixel PR(n−1) display an image having the black gray-scale.

A second voltage is applied to the pixel electrode 318 of the n-th left-eye pixel PLn and the n-th right-eye pixel PRn. The second voltage is larger than the first voltage. An effective azimuth angle of the liquid crystal layer 330 is maximized at a center between the n-th left-eye pixel PLn and the n-th right-eye pixel PRn, and the effective azimuth angle of the liquid crystal layer 330 decreases as positioned farther away from the center between the n-th left-eye pixel PLn and the n-th right-eye pixel PRn. However, because the second voltage is larger than the first voltage, the effective azimuth angle of the liquid crystal layer 330 at ends of the n-th left-eye pixel PLn and the n-th right-eye pixel PRn is larger than that of the (n−1)-th left-eye pixel PL(n−1) and the (n−1)-th right-eye pixel PR(n−1). Thus, the phase shift of the light passing through the liquid crystal layer 330 in the n-th left-eye pixel PLn and the n-th right-eye pixel PRn is smaller than that of the (n−1)-th left-eye pixel PL(n−1) and the (n−1)-th right-eye pixel PR(n−1). Therefore, a portion of the light passing through the liquid crystal layer 330 in the n-th left-eye pixel PLn and the n-th right-eye pixel PRn is refracted to be focused onto the light blocking pattern 322, and the another portion of the light passes through the second display substrate 320, so that the n-th left-eye pixel PLn and the n-th right-eye pixel PRn displays an image having the middle gray-scale.

A third voltage is applied to the pixel electrode 318 of the (n+1)-th left-eye pixel PL(n+1) and the (n+1)-th right-eye pixel PR(n+1). The third voltage is larger than the second voltage. An effective azimuth angle of the liquid crystal layer 330 is maximized in a center between the (n+1)-th left-eye pixel PL(n+1) and the (n+1)-th right-eye pixel PR(n+1), and the effective azimuth angle of the liquid crystal layer 330 decreases as positions are farther away from the center between the (n+1)-th left-eye pixel PL(n+1) and the (n+1)-th right-eye pixel PR(n+1). However, because the third voltage is larger than the second voltage, the effective azimuth angle of the liquid crystal layer 330 at ends of the (n+1)-th left-eye pixel PL(n+1) and the (n+1)-th right-eye pixel PR(n+1) is larger than that of the n-th left-eye pixel PLn and the n-th right-eye pixel PRn. Thus, the phase shift of the light passing through the liquid crystal layer 330 in the (n+1)-th left-eye pixel PL(n+1) and the (n+1)-th right-eye pixel PR(n+1) is substantially equal. Therefore, most of the light passing through the liquid crystal layer 330 in the (n+1)-th left-eye pixel PL(n+1) and the (n+1)-th right-eye pixel PR(n+1) pass through the second display substrate 320, so that the (n+1)-th left-eye pixel PL(n+1) and the (n+1)-th right-eye pixel PR(n+1) display an image having the white gray-scale.

At this time, if the n-th left-eye pixel PLn and the n-th right-eye pixel PRn display a same image, the display panel 300 displays a 2D image.

Alternatively, if the n-th left-eye pixel PLn and the n-th right-eye pixel PRn display images different from each other, the display panel 300 displays a 3D stereoscopic image.

According to exemplary embodiments, the lens panel is driven as a Fresnel or GRIN lens, so that a cell gap of the lens panel is decreased and the response speed is enhanced. Thus, manufacturing efficiency is enhanced, and manufacturing cost is decreased.

Thus, the lens panel is driven as a Fresnel or GRIN lens by adjusting a polar angle of the alignment layer, so that reliability of the lens panel is enhanced. In addition, the lens panel is driven by applying the same voltage to the first electrode, the voltage being applied by an external circuit substrate without using an additional data driver, so that manufacturing cost is decreased.

The third alignment layer is aligned to have a plurality of polar angles different from each other. Thus, the gray-scale of the display panel is adjusted by the polar angles of the third alignment layer and a light blocking pattern, and an upper polarizer is not utilized.

In addition, the amount of the ultraviolet is adjusted by changing sizes of the openings of the mask, so that the alignment layer may be easily formed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A lens panel comprising:
   a first substrate comprising:
   a first base substrate,
   a first electrode disposed on the first base substrate, and
   a first alignment layer disposed on the first electrode, the first alignment layer comprising a plurality of unit alignment areas that form a lens unit;
   a second substrate comprising:
   a second base substrate,
   a second electrode formed on the second base substrate, and
   a second alignment layer having a second azimuth angle; and
   a liquid crystal layer disposed between the first substrate and the second substrate,
   wherein:
   the unit alignment areas of the first alignment layer have different polar angles, and the second alignment layer has a uniform polar angle for all of the unit alignment areas such that the liquid crystal layer has different effective azimuth angles in each of the unit alignment areas depending on a polar angle difference between the first and second alignment layers when an electric field is applied thereto; and widths of the unit alignment areas increase as the unit alignment areas are closer to a center of the corresponding lens unit.

2. The lens panel of claim 1, wherein the polar angles of the first alignment layer increase in value as positioned closer to a center of the corresponding lens unit.

3. The lens panel of claim 2, wherein an increase rate of the polar angles of the first alignment layer decreases closer to the center of the corresponding lens unit.

4. The lens panel of claim 2, wherein the plurality of polar angles of the first alignment layer decrease in value between adjacent unit alignment areas.

5. The lens panel of claim 1, wherein the first and second alignment layers have different azimuth angles from each other.

6. The lens panel of claim 5, wherein the difference between the azimuth angles of the first and second alignment layers is about 90°.

7. The lens panel of claim 1, wherein the first substrate comprises a light absorbing material.

8. The lens panel of claim 1, further comprising a light absorbing layer disposed on a surface of the second substrate opposite a surface of the second substrate on which the second alignment layer is disposed.

9. A display apparatus comprising:
   a panel module to display a 2-dimensional (2D) image or a 3-dimensional (3D) stereoscopic image;
   a lens panel comprising:
      a first substrate,
      a second substrate, and
      a liquid crystal layer disposed between the first substrate and the second substrate, the first substrate comprising:
         a first alignment layer; and
         a first electrode, the first alignment layer comprising a plurality of unit alignment areas, each of the unit alignment areas having a first azimuth angle, the unit alignment areas forming a lens unit,
      the second substrate comprising:
         a second alignment layer; and
         a second electrode, the second alignment layer having a second azimuth angle; and
   a light source module disposed along with the panel module to supply light to the panel module,
   wherein:
   the unit alignment areas of the first alignment layer have different polar angles, and the second alignment layer has a uniform polar angle for all of the unit alignment areas such that the liquid crystal layer has different effective azimuth angles in each of the unit alignment areas depending on a polar angle difference between the first and second alignment layers when an electric field is applied thereto;
   widths of the unit alignment areas increase as the unit alignment areas are closer to a center of the corresponding lens unit.

* * * * *